United States Patent
Nagata et al.

(10) Patent No.: US 9,073,215 B2
(45) Date of Patent: Jul. 7, 2015

(54) ROBOT SYSTEM

(71) Applicant: KABUSHIKI KAISHA YASKAWA DENKI, Kitakyushu-shi (JP)

(72) Inventors: Hideo Nagata, Fukuoka (JP); Tomoyuki Sekiyama, Fukuoka (JP); Yasuyuki Inoue, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 23 days.

(21) Appl. No.: 14/183,378

(22) Filed: Feb. 18, 2014

(65) Prior Publication Data
US 2014/0163737 A1    Jun. 12, 2014

Related U.S. Application Data

(63) Continuation of application No. PCT/JP2011/068797, filed on Aug. 19, 2011.

(51) Int. Cl.
*G05B 15/00* (2006.01)
*G06F 7/00* (2006.01)
*G06F 19/00* (2011.01)
*B25J 9/16* (2006.01)

(52) U.S. Cl.
CPC ..... *B25J 9/1697* (2013.01); *G05B 2219/39057* (2013.01); *G05B 2219/40053* (2013.01); *G05B 2219/40575* (2013.01); *G05B 2219/40613* (2013.01)

(58) Field of Classification Search
CPC combination set(s) only.
See application file for complete search history.

(56) References Cited

U.S. PATENT DOCUMENTS

2004/0243282 A1  12/2004  Watanabe et al.
2010/0004778 A1  1/2010  Arimatsu et al.

FOREIGN PATENT DOCUMENTS

| CN | 101618544 | 1/2010 |
|---|---|---|
| JP | 58-137595 | 8/1983 |
| JP | 04-030991 | 2/1992 |
| JP | 2004-351570 | 12/2004 |
| JP | 2010-012567 | 1/2010 |
| JP | 2011-056595 | 3/2011 |

OTHER PUBLICATIONS

International Search Report for corresponding International Application No. PCT/JP2011/068797, Nov. 22, 2011.
Chinese Office Action for corresponding CN Application No. 201180072923.2, Jan. 28, 2015.
International Preliminary Report on Patentability with Translation of Written Opinion of the International Searching Authority for corresponding International Application No. PCT/JP2011/068797, Feb. 25, 2014.

*Primary Examiner* — Bhavesh V Amin
(74) *Attorney, Agent, or Firm* — Mori & Ward, LLP

(57) ABSTRACT

A robot system includes: a robot including a camera unit shooting an object in a container, a hand gripping the object, and a contact detector detecting that the hand contacts the container; and a robot control device, which includes a control unit causing the hand to contact the container; a contact detection unit detecting by the contact detector that the hand contacts the container, and finding a contact position thereof; a first processing unit calculating a position of the container from a stereo image of the container acquired by the camera unit; a second processing unit calculating a difference between the position of the container calculated by the first processing unit and the contact position found by the contact detection unit as a correction amount; and a third processing unit correcting information on a position in a height direction of the object in the container based on the correction amount.

8 Claims, 29 Drawing Sheets

ROBOT SYSTEM

CROSS-REFERENCE TO RELATED APPLICATIONS

This application is a continuation application of PCT Application No. PCT/JP2011/068797 filed on Aug. 19, 2011, the entire contents of which are incorporated herein by reference.

BACKGROUND

1. Field

This disclosure relates to a robot system.

2. Disclosure of the Related Art

Japanese Patent Application Laid-Open No. S58-137595 describes a hand eye-equipped robot therein. The hand eye-equipped robot is configured such that at least an imaging optical system of an imaging device is attached on an arm mounting a mechanical hand and visual information necessary for the works by the mechanical hand is obtained.

SUMMARY

A robot system according to an aspect of this disclosure includes a robot including a camera unit shooting an object in a container, a hand gripping the object, and a contact detector detecting that the hand contacts the container; and a robot control device controlling the robot, wherein the robot control device includes: 1) a control unit moving the hand toward the container, and causing the hand to contact the container; 2) a contact detection unit detecting by the contact detector that the hand contacts the container, and finding a contact position thereof; 3) a first processing unit calculating a position of the container from a stereo image of the container acquired by the camera unit; 4) a second processing unit calculating a difference between the position of the container calculated by the first processing unit and the contact position found by the contact detection unit as a correction amount; and 5) a third processing unit correcting information on a position in a height direction of the object in the container based on the correction amount.

A robot system according to another aspect of this disclosure includes a robot including a camera unit shooting an object in a container, a hand gripping the object, and a contact detector detecting that the hand contacts the container; and a robot control device controlling the robot, wherein the robot control device includes: 1) a control unit moving the hand toward the container, and causing the hand to contact the container at first to sixth different contact positions; 2) a contact detection unit detecting by the contact detector that the hand contacts the container, finding the first to sixth contact positions, and finding a position and orientation of the container from the found first to sixth contact positions; 3) a first processing unit calculating the position and orientation of the container from a stereo image of the container acquired by the camera unit; 4) a second processing unit calculating a homogenous transformation matrix $^F T_C$ expressing a position and orientation of the camera unit viewed from a flange coordinate system fixed on a flange of a wrist of the robot based on the position and orientation of the container calculated in the first processing unit and the position and orientation of the container found by the contact detection unit; and 5) a third processing unit correcting information on a position and orientation of the object in the container based on the homogenous transformation matrix $^F T_C$.

A robot system according to another aspect of this disclosure includes a robot including a camera unit shooting an object in a container, and a hand gripping the object; and a robot control device controlling the robot, wherein the robot control device includes: 1) a control unit moving the hand toward the container and causing the hand to contact the container; 2) a contact position output means outputting a contact position when the hand contacts the container; 3) a first processing unit calculating a position of the container from a stereo image of the container acquired by the camera unit; 4) a second processing unit calculating a difference between the position of the container calculated by the first processing unit and the contact position output from the contact position output means as a correction amount; and 5) a third processing unit correcting information on a position of the object in the container based on the correction amount.

DETAILED DESCRIPTION

Embodiments will be described below with reference to the accompanying drawings for understanding the present invention. In each Figure, a part non-related to the description may not be illustrated.

First Embodiment

Figure 1:
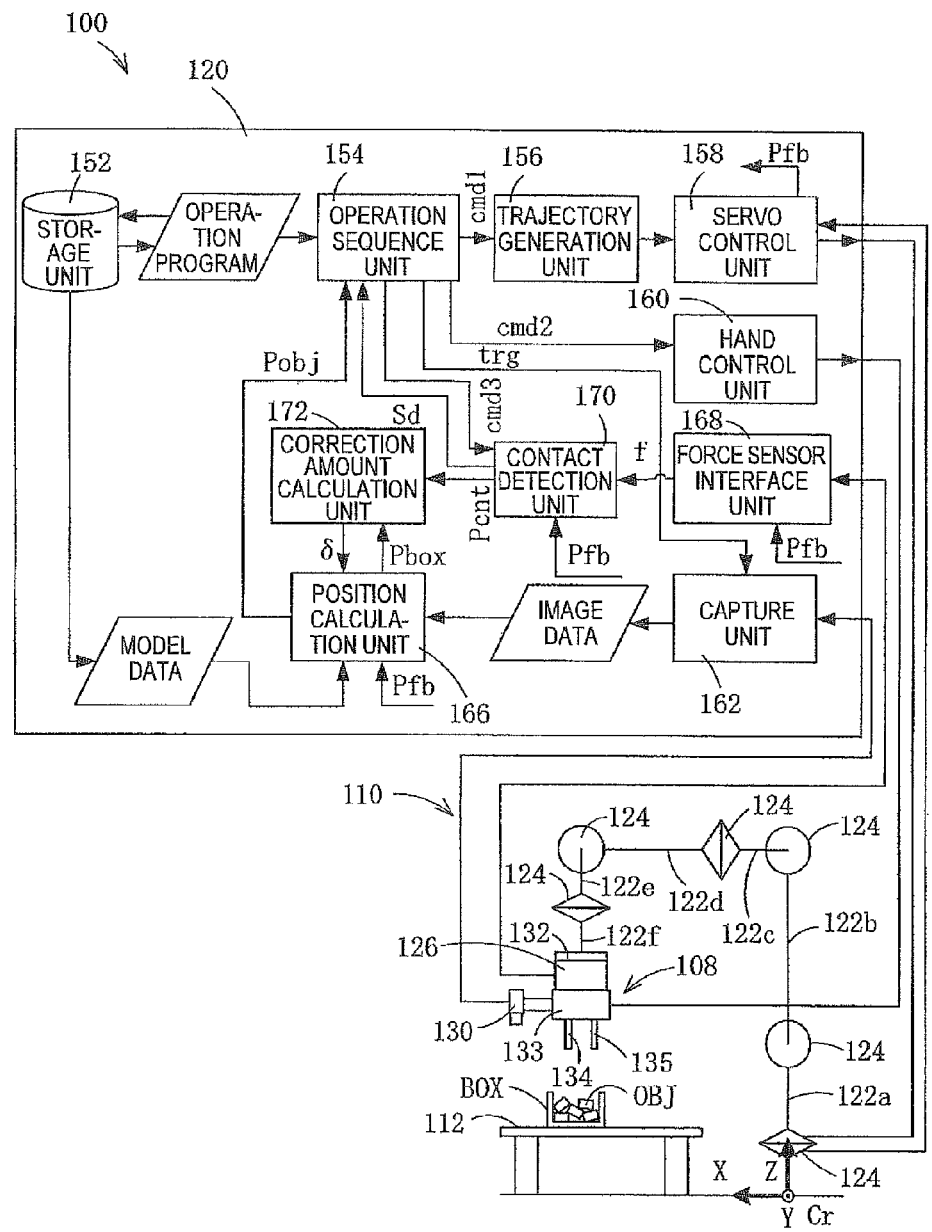
FIG. 1 is a configuration diagram of a robot system according to a first embodiment.
Figure 10:
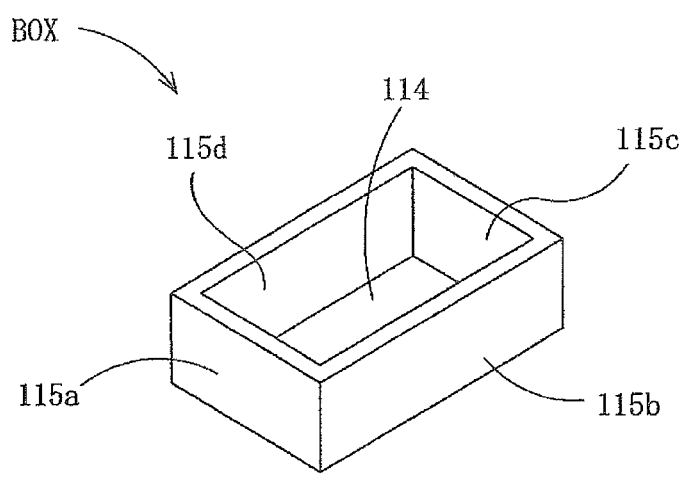
FIG. 10 is a perspective view of an object housing container.

A robot system 100 according to a first embodiment includes a robot 110, and a robot control device 120 for controlling the operations of the robot 110 as illustrated in FIG. 1. The robot 110 take a stacked object (exemplary object) OBJ from an object housing container (exemplary container) BOX placed at a position on a work table 112. The object housing container BOX has a rectangular bottom plate 114 and four side plates 115a to 115d configuring the sides, and is opened at the top side as illustrated in FIG. 10, for example. The robot 110 in FIG. 1 is schematically illustrated. A coordinate illustrated in FIG. 1 is a robot coordinate system Cr. The forward direction of the X axis, the forward direction of the Y axis, and the forward direction of the Z axis of the robot coordinate system Cr are forward, leftward and upward from the robot 110, respectively.

The robot 110 includes a plurality of links 122a to 122f, and is a six-axis multijoint robot, for example. The links 122a to 122f are coupled with each other via joints 124. Each joint 124 is driven by a servo motor (not illustrated) having an encoder.

The robot 110 further includes a force sensor (exemplary contact detector) 126, a hand (robot hand) 108, and a camera unit 130 as illustrated in FIG. 1. The force sensor 126 detects a force applied to the hand 108, and output an electric signal according to the force. That is, based on the output signal from the force sensor 126, it may be possible to detect that the hand 108 contacts an object. The force sensor 126 is provided at a flange 132 of the wrist positioned at the tip of the robot 110, for example. A force at least in a contact direction may be detected by the force sensor 126 when a contact direction between the hand 108 and the object is previously determined.

The contact detector may be any sensor capable of detecting that the hand 108 contacts an object. Other exemplary contact detectors may be a contact sensor, or a pressure sensor for detecting contact as a change in pressure.

Further, a detection means for electrically detecting contact by the presence of conduction may be used to detect that the hand 108 contacts an object. A detection means for detecting contact based on the fact that a disturbance torque indicated in a difference between a torque command value and a load torque of the motor for driving each joint exceeds a preset threshold may be used to detect that the hand 108 contacts an object.

The hand 108 is provided at the tip of the force sensor 126. The hand 108 has a base part 133, and a pair of grip claws 134 and 135 extending from the base part 133 for opening and closing. The hand 108 opens or closes the grip claws 134 and 135 thereby to grip an object OBJ to be gripped. The grip claws 134 and 135 are driven by the servo motor (not illustrated) to be opened or closed.

The camera unit 130 is configured of two cameras provided at different positions, and shoots an object OBJ from the two different positions at a time. Thus, two images (stereo images) of the object can be acquired at a time by the camera unit 130 without changing the shooting positions. The camera unit 130 is attached on the base part 133 of the hand 108 or the flange 132 at the wrist of the robot 110, for example. The camera unit 130 may be configured of only one camera. In this case, the robot 110 moves so that the camera unit 130 shoots the object OBJ from two different positions. 3D measurement data (object shape) of the object OBJ is acquired by the stereo images acquired by the camera unit 130.

The robot control device 120 includes a storage unit 152, an operation sequence unit 154, a trajectory generation unit 156, a servo control unit (exemplary control unit) 158, and a hand control unit 160 as illustrated in FIG. 1. The robot control device 120 further includes a capture unit 162, a position calculation unit 166, a force sensor interface unit 168, a contact detection unit (exemplary contact position output means) 170, and a correction amount calculation unit (exemplary second processing unit) 172. The robot control device 120 incorporates a CPU and a memory, which are not illustrated. Each function indicated in the functional block diagram illustrated in FIG. 1 is realized by a software program executed by the CPU, or hardware.

The storage unit 152 stores at least one operation program (JOB) describing the commands for operating the robot 110 therein. The storage unit 152 stores model data expressing a preset shape and dimension of the object OBJ. The storage unit 152 is configured of a nonvolatile semiconductor memory or HDD, for example.

The operation sequence unit 154 analyzes the operation program thereby to perform necessary processing. In a first example, the operation sequence unit 154 outputs a command cmd1 of generating a trajectory to the trajectory generation unit 156 based on a linear movement command described in the operation program. In the second example, the operation sequence unit 154 outputs a command cmd2 of closing the grip claws 134 and 135 to the hand control unit 160 based on a close command described in the operation program. Further, the operation sequence unit 154 outputs a shooting trigger trg as a shooting timing of the camera unit 130. The operation sequence unit 154 outputs a command cmd3 for starting an operation to the contact detection unit 170.

The trajectory generation unit 156 generates a trajectory of the robot 110 based on the command cmd1 from the operation sequence unit 154. For example, the trajectory generation unit 156 generates a trajectory for linearly moving the hand 108 of the robot 110 up to a target position set by the linear movement command based on the command cmd1 from the operation sequence unit 154. The robot 110 operates based on the generated trajectory thereby to move the hand 108 to a position at which the object OBJ is gripped or to move the camera unit 130 a shooting position of the object housing container BOX or object OBJ.

The servo control unit 158 controls a servo motor for driving each joint 124 of the robot 110 according to the trajectory generated by the trajectory generation unit 156. The servo control unit 158 receives a signal from the encoder of each servo motor, and outputs position feedback information of the encoder (angle acquired from the encoder) Pfb.

The hand control unit 160 controls a motor for driving the grip claws 134 and 135 of the hand 108 to open or close the grip claws 134 and 135 based on the command cmd2 output from the operation sequence unit 154.

The capture unit 162 fetches an image from the camera unit 130 to create image data as a stereo image at a timing when the operation sequence unit 154 outputs a shooting trigger trg.

Figure 2:
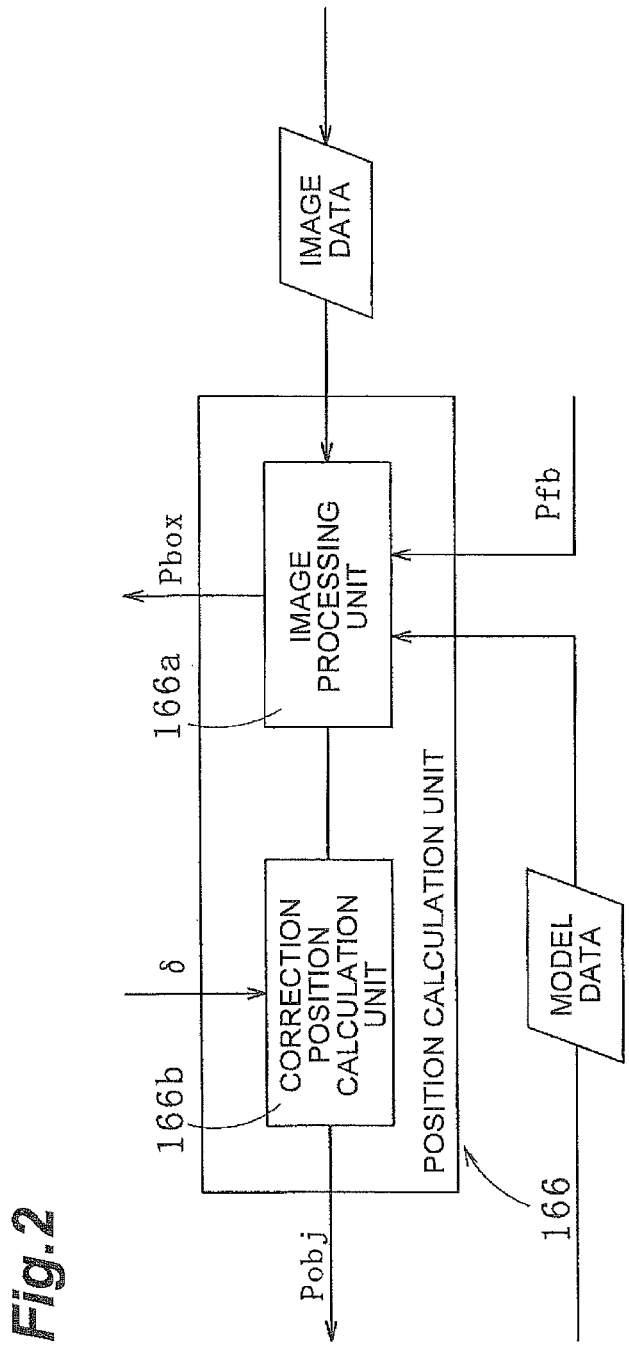
FIG. 2 is a block diagram of a position calculation unit provided in a robot control device in the robot system.

The position calculation unit 166 calculates the 3D positions (which will be simply denoted as "position" below) of the object housing container BOX and the object OBJ shot by the camera unit 130 as a position Pbox and a position Pobj, respectively, based on the image data created by the capture unit 162. The positions Pbox and Pobj are expressed in the robot coordinate system Cr illustrated in FIG. 1 based on the position feedback information Pfb of the encoder. More specifically, the position calculation unit 166 includes an image processing unit (exemplary first processing unit) 166a and a correction position calculation unit (exemplary third processing unit) 166b as illustrated in FIG. 2. The image processing unit 166a processes the image data of the object housing container BOX to output the position Pbox of the object housing container BOX to the correction amount calculation unit 172. The correction position calculation unit 166b corrects information on a position in the height direction of the object OBJ based on the correction amount δ output by the correction amount calculation unit 172, and outputs the corrected position Pobj of the object OBJ to the operation sequence unit 154.

Figure 5:
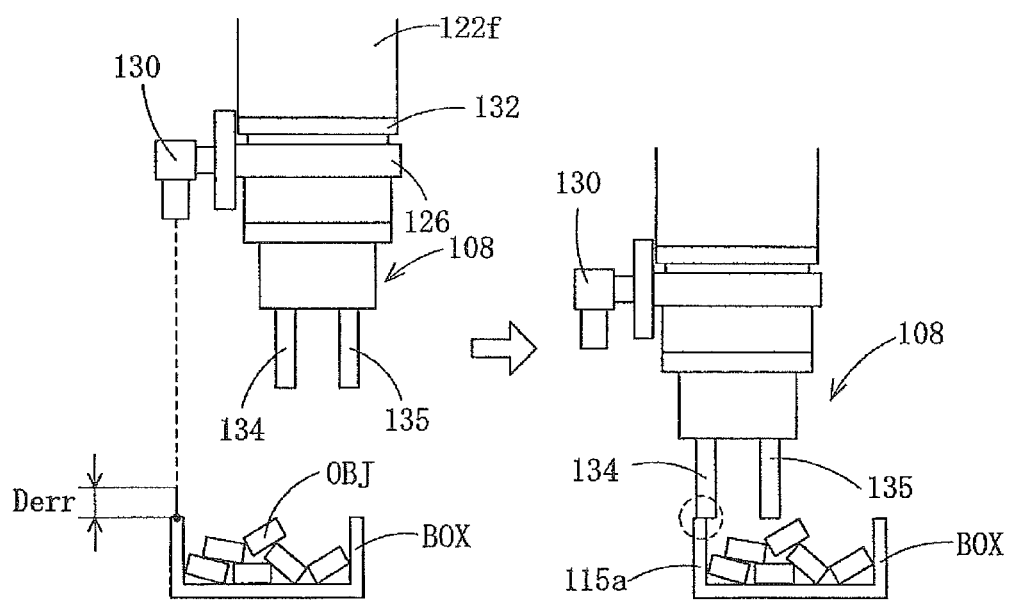
FIG. 5 is an explanatory diagram illustrating operations of a robot provided in the robot system in correction amount calculation processing.

Generally, the position of the object OBJ calculated based on the image data acquired from the stereo image contains an error. Thus, if the hand 108 is controlled based on the position, it may fail to grip the object OBJ. The position of the object OBJ may have a large error Derr (see the left side of FIG. 5) particularly in the height direction (direction from the camera unit 130 toward the shooting target).

The force sensor interface unit 168 fetches an electric signal output from the force sensor 126 and outputs force data f. The force sensor interface unit 168 converts the unit of force data f from electric quantity to physical quantity. The force sensor interface unit 168 performs coordinate transformation processing of expressing the force data f in the robot coordinate system Cr based on the position feedback information Pfb of the encoder.

The contact detection unit 170 monitors the force data f at a predetermined cycle, and detects that the hand 108 of the robot 110 contacts the object housing container BOX. The contact detection unit 170 calculates a contact position Pcnt between the hand 108 and the object housing container BOX based on the position of the robot 110 on the contact. The contact position Pcnt is output to the correction amount calculation unit 172. The detection processing unit 170 starts the operation based on the command cmd3 output from the operation sequence unit 154.

The correction amount calculation unit 172 calculates, as the correction amount δ, a difference in the height direction between the position Pbox of the object housing container BOX calculated by the image processing unit 166a in the position calculation unit 166, and the actual contact position Pcnt between the hand 108 and the object housing container BOX. The correction amount 6 is output to the position calculation unit 166.

Figure 3:
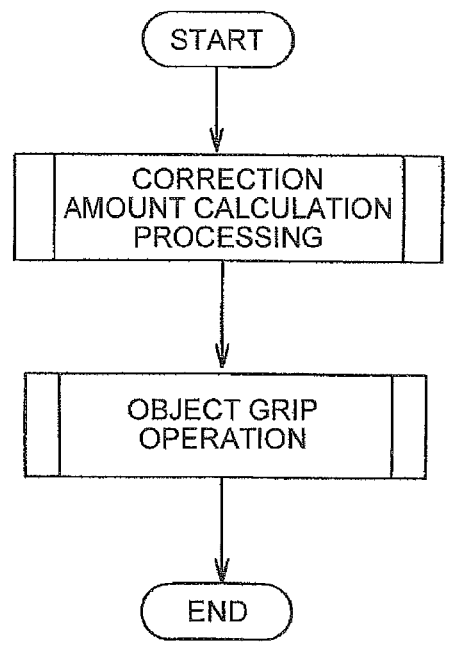
FIG. 3 is a flowchart illustrating schematic operations of a robot system provided in the robot system.

The operations of the robot system 100 (method for controlling the robot) will be described below. The robot system 100 performs the correction amount calculation processing (step S101 to step S107 in FIG. 4), and then performs the object grip operation (step S108 to step S114) as illustrated in FIG. 3. Each step will be described below.

(Step S101)

Figure 4:
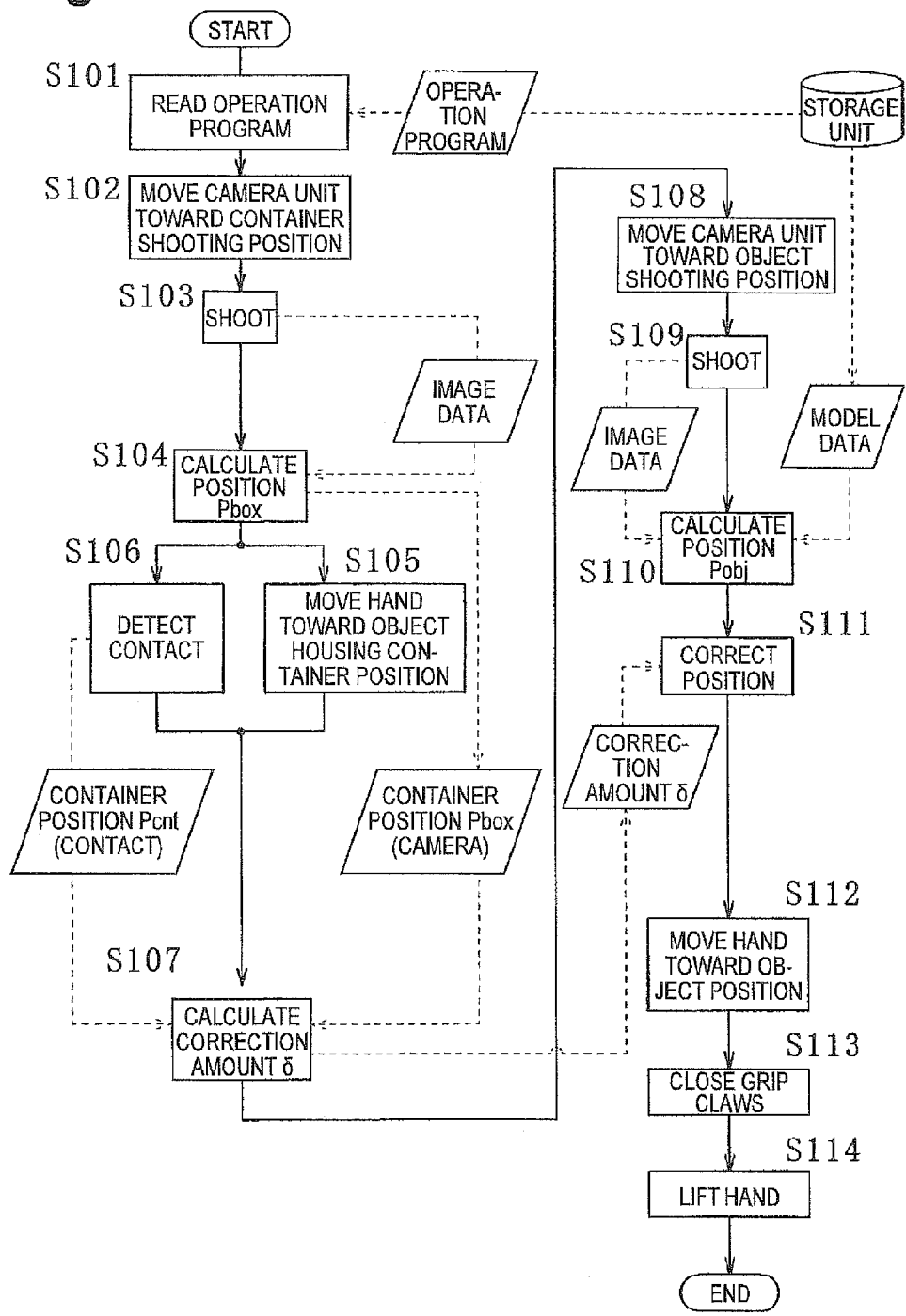
FIG. 4 is a flowchart illustrating detailed operations of the robot system provided in the robot system.

As illustrated in FIG. 4, the operation sequence unit 154 in the robot control device 120 reads the at least one operation program from the storage unit 152.

(Step S102)

The operation sequence unit 154 outputs the command cmd1 based on a command of moving the camera unit 130 to the shooting position of the object housing container BOX. The trajectory generation unit 156 generates a trajectory for moving the camera unit 130 to the shooting position of the object housing container BOX. The servo control unit 158 controls the robot 110 based on the generated trajectory. Consequently, as illustrated in the left side of FIG. 5, the camera unit 130 in the robot 110 is positioned to the position at which the object housing container BOX is shot.

(Step S103)

The operation sequence unit 154 outputs the shooting trigger trg. When input with the shooting trigger trg, the capture unit 162 controls the camera unit 130 and shoots a stereo image of the object housing container BOX. The capture unit 162 outputs image data as the shot stereo image.

(Step S104)

The image processing unit 166a (see FIG. 2) in the position calculation unit 166 performs image processing on the image data acquired from the capture unit 162, and calculates the position (exemplary first information) Pbox of the object housing container BOX. The position Pbox of the object housing container BOX is output to the correction amount calculation unit 172.

(Step S105)

The operation sequence unit 154 outputs the command cmd1 based on a command of causing the hand 108 to contact the object housing container BOX. The trajectory generation unit 156 generates a trajectory for moving the hand 108 toward the upper end surface of the side plate 115a (see FIG. 10) configuring the object housing container BOX, for example, based on the command cmd1. The servo control unit 158 controls the robot 110 based on the generated trajectory. The hand 108 descends toward the object housing container BOX.

(Step S106)

When the hand 108 descends, the operation sequence unit 154 outputs the command cmd3 and the contact detection unit 170 monitors the force data f. As illustrated in the right side of FIG. 5, when the grip claw 134 of the hand 108 contacts the upper end surface of the side plate 115a configuring the object housing container BOX, the contact detection unit 170 detects the contact based on the force data f.

When detecting the contact, the contact detection unit 170 outputs a contact detection signal Sd to the operation sequence unit 154. The operation sequence unit 154 stops the descending of the hand 108. That is, the trajectory generation unit 156 generates a trajectory for decelerating and stopping the robot 110. The servo control unit 158 controls the robot 110 according to the trajectory.

The contact detection unit 170 calculates a contact position (exemplary second information) Pcnt of the hand 108 based on the position feedback information (angle acquired from the encoder) Pfb of each servo motor of the robot 110 when the hand 108 contacts the object housing container BOX.

The contact position Pcnt of the hand 108 is calculated via the following first procedure and second procedure. In the first procedure, the position feedback position Pfb of each servo motor of the robot 110 is subjected to forward kinematics transformation so that a position and orientation of the flange 132 viewed from the robot coordinate system Cr is calculated. In the second procedure, the position of the tip (control point) of the hand 108 viewed from the flange 132 is added to the position and orientation of the flange 132 calculated in the first procedure.

In a first method, the operation sequence unit 154 starts the present step (contact detection operation) 5106 at the same time with the start of the descending operation of the hand 108 indicated in step S105. In a second method, the operation sequence unit 154 first positions the hand 108 at a position in the horizontal direction of the object housing container BOX acquired from the image data, and then starts the present step S106 after moving the hand 108 up to a position H2 above a position H1 in the height direction based on the position H1 in the height direction of the object housing container BOX acquired from the image data. Generally, the hand 108 needs to be moved at a low speed in the contact detection operation indicated in the present step S106, and thus the second method may be selected than the first method in terms of a reduction in processing time.

(Step S107)

The correction amount calculation unit 172 calculates a difference in the height between the contact position Pent of the hand 108 and the position Pbox of the object housing container BOX calculated by the position calculation unit 166 based on the image data in step S104. The correction amount calculation unit 172 finds the difference as the correction amount δ of the position of the object OBJ based on the image data.

(Step S108)

Figure 6:
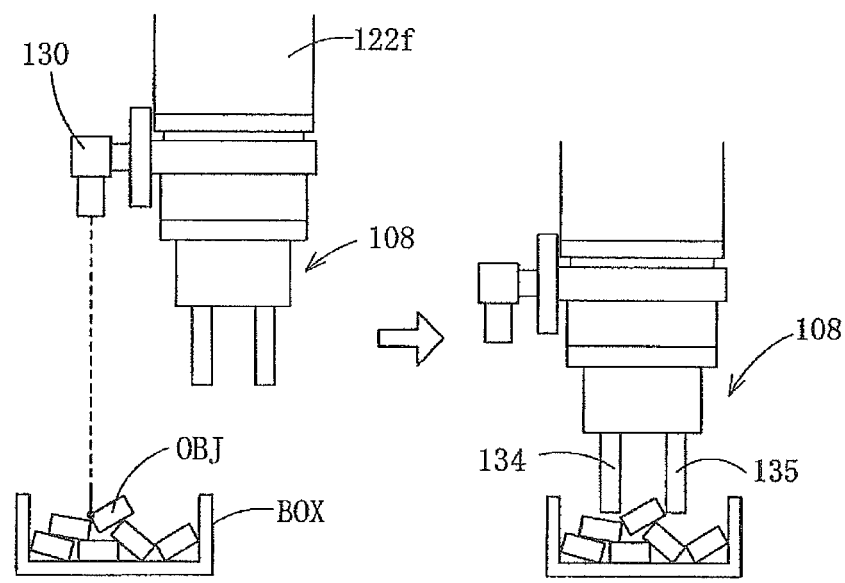
FIG. 6 is an explanatory diagram illustrating operations of the robot provided in the robot system in an object grip operation.

The trajectory generation unit 156 generates a trajectory for moving the camera unit 130 to the shooting position for shooting the object OBJ in the object housing container BOX. The servo control unit 158 controls the robot 110 based on the generated trajectory. Consequently, as illustrated in the left side of FIG. 6, the camera unit 130 is positioned to the position at which the object OBJ is shot.

(Step S109)

The operation sequence unit 154 outputs the shooting trigger trg. When input with the shooting trigger trg, the capture unit 162 controls the camera unit 130 and shoots a stereo image of the object OBJ in the object housing container BOX. The capture unit 162 outputs image data as the stereo image.

(Step S110)

The image processing unit 166a (see FIG. 2) in the position calculation unit 166 extracts the object OBJ from the image data and performs image processing thereon to calculate a position and orientation of the object OBJ by use of model data (see FIG. 1) of the object OBJ read from the storage unit 152.

(Step S111)

The correction position calculation unit 166b in the position calculation unit 166 adds the correction amount δ found by the correction amount calculation unit 172 in step S107 to the calculated position in the height direction of the object OBJ. That is, the correction position calculation unit 166b corrects information (exemplary information on the position of the object) on a position in the height direction of the object OBJ found by use of the camera unit 130. The corrected position Pobj of the object OBJ is output to the operation sequence unit 154.

(Step S112)

The operation sequence unit 154 sets the corrected position Pobj of the object OBJ as a moving target value of the hand 108, and outputs the command cmd1 of generating a trajectory to the trajectory generation unit 156. The trajectory generation unit 156 generates a trajectory for moving the hand 108 toward the corrected position Pobj of the object OBJ. The servo control unit 158 controls the robot 110 based on the generated trajectory. Consequently, as illustrated in the right side of FIG. 6, the hand 108 of the robot 110 is positioned to the position at which the object OBJ is gripped.

(Step S113)

The operation sequence unit 154 analyzes the at least one operation program, and outputs the command cmd2 based on a close command of closing the grip claws 134 and 135. The hand control unit 160 controls the motor for driving the grip claws 134 and 135 of the hand 108 based on the command cmd2. Consequently, the grip claws 134 and 135 are closed and the hand 108 grips the object OBJ.

(Step S114)

The operation sequence unit 154 outputs the command cmd1 based on a command of lifting the hand 108. The trajectory generation unit 156 generates a trajectory for lifting the hand 108 based on the command cmd1 from the operation sequence unit 154. The servo control unit 158 controls the robot 110 based on the generated trajectory. Consequently, the robot 110 moves the hand 108 upward, and the robot 110 can take the object OBJ.

As described above, the robot system 100, the robot control device 120, the robot hand 108 and the method for controlling the robot 110 according to the present embodiment can take the object OBJ from the object housing container BOX even if an error is in the position in the height direction of the object OBJ acquired from the stereo image shot by the camera unit 130. The robot system 100 contacts not the object OBJ to be gripped by the hand 108 but the object housing container BOX housing the object OBJ thereby to find the correction amount δ, and thus the position of the stacked object OBJ can be less shifted when the hand 108 contacts the object OBJ.

In the present embodiment, a position to be contacted by the hand 108 is not limited to the upper end of the side plate 115a (see FIG. 10) configuring the object housing container BOX. Generally, when a position where the object housing container BOX is placed changes, an error in the position in the height direction of the object OBJ acquired from the camera unit 130 also varies. When the variation in the error is within a permitted range, the correction amount calculation processing illustrated in FIG. 3 (step S101 to step S107 in FIG. 4) may be performed only once at least when the robot 110 is instructed.

Second Embodiment

Subsequently, a robot system 200 according to a second embodiment will be described. The same constituents and operation steps as those in the robot system 100 according to the first embodiment are denoted with the same reference numerals, and a detailed description thereof may be omitted. The hand 108 contacts at least six different points on the object housing container BOX so that the robot system 200 illustrated in FIG. 7 performs a procedure of calculating not only a position of the object housing container BOX bus also a orientation thereof.

Figure 8:
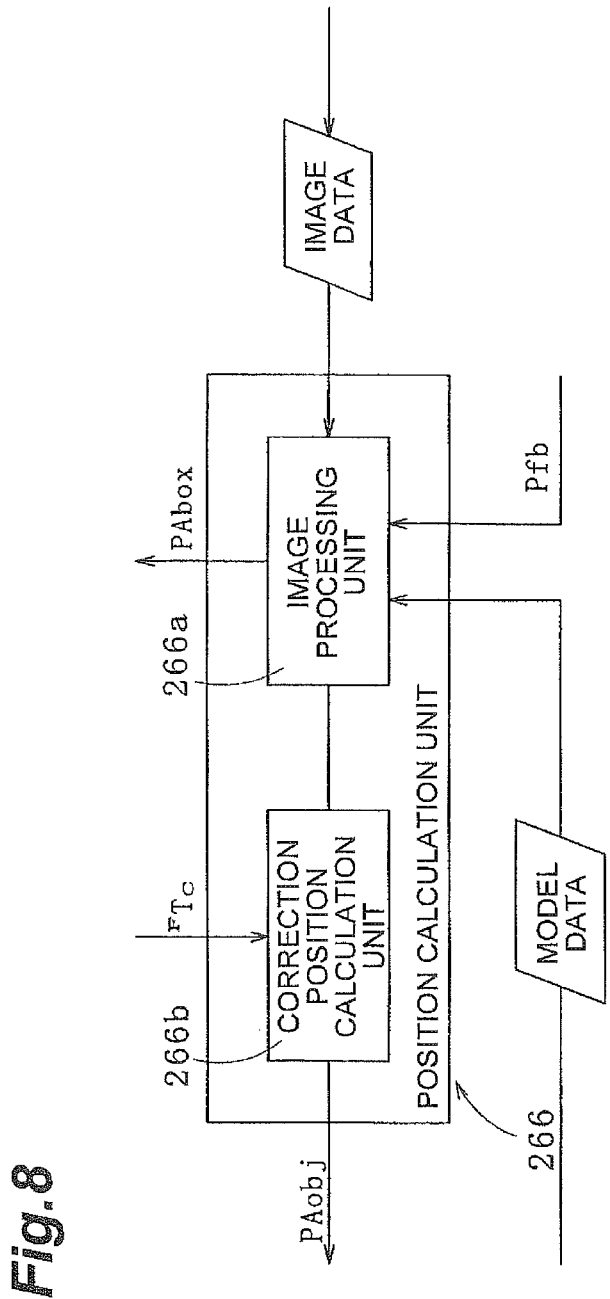
FIG. 8 is a block diagram of a position calculation unit provided in a robot control device in the robot system.

A position calculation unit 266 calculates the 3D positions and orientations (which will be simply denoted as "position and orientation" below) of the object housing container BOX and the object OBJ shot by the camera unit 130 as a position and orientation PAbox and a position and orientation Pobj, respectively, based on the image data created by the capture unit 162. The positions and orientations PAbox and PAobj are expressed in the robot coordinate system Cr illustrated in FIG. 1 based on the position feedback information Pfb of the encoder. More specifically, the position calculation unit 266 includes an image processing unit (exemplary first processing unit) 266a and a correction position calculation unit (exemplary third processing unit) 266b as illustrated in FIG. 8. The image processing unit 266a processes the image data of the object housing container BOX to output the position and orientation PAbox of the object housing container BOX to a correction amount calculation unit 272. The correction position calculation unit 266b corrects information on the position and orientation of the object OBJ based on a homogenous transformation matrix $^{F}T_{C}$ output from the correction amount calculation unit 272, and outputs the corrected position and orientation PAobj of the object OBJ to the operation sequence unit 154.

A contact detection unit 270 finds a position and orientation PAcnt of the object housing container BOX from the six different contact positions of the hand.

The correction amount calculation unit 272 (exemplary second processing unit) calculates a homogenous transformation matrix $^{F}T^{C}$ for expressing a position and orientation of the camera unit 130 viewed from a flange coordinate system Cf fixed on the flange 132 of the robot 110 on the basis of the position and orientation PAbox of the object housing container BOX calculated based on the image data and the position and orientation PAcnt of the object housing container BOX found from the contact of the hand.

The operations of the robot system 200 (method for controlling the robot) will be described below. As illustrated in FIG. 3, the robot system 200 performs the correction amount calculation processing (step S201 to step S209 illustrated in FIG. 9), and then performs the object grip operation (steps corresponding to step S108 to step S114 illustrated in FIG. 4). Only the correction amount calculation processing will be described for each step.

Figure 9:
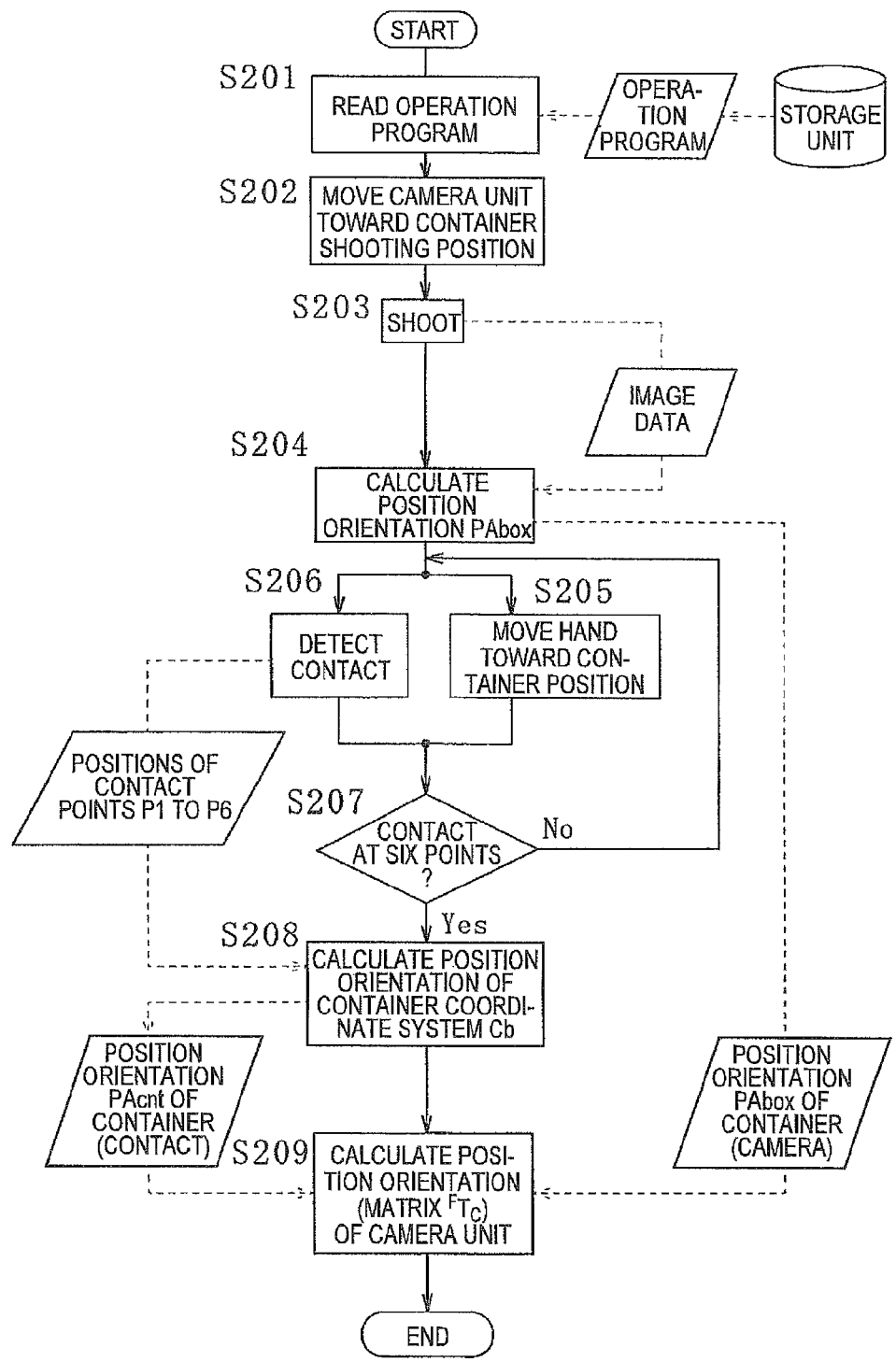
FIG. 9 is a flowchart illustrating correction amount calculation processing of the robot system.

(Step S201)
As illustrated in FIG. 9, the operation sequence unit 154 in a robot control device 220 reads the at least one operation program from the storage unit 152.

(Step S202)
The operation sequence unit 154 outputs the command cmd1 based on a command of moving the camera unit 130 to a shooting position of the object housing container BOX. The trajectory generation unit 156 generates a trajectory for moving the camera unit 130 to the shooting position of the object housing container BOX. The servo control unit 158 controls the robot 110 based on the generate trajectory. Consequently, as illustrated in the left side of FIG. 5, the camera unit 130 in the robot 110 is positioned to a position at which the object housing container BOX is shot.

(Step S203)
The operation sequence unit 154 outputs the shooting trigger trg. When input with the shooting trigger trg, the capture unit 162 controls the camera unit 130 to shoot a stereo image of the object housing container BOX. The capture unit 162 outputs image data as the shot stereo image.

(Step S204)
The image processing unit 266a in the position calculation unit 266 (see FIG. 8) performs image processing on the image data acquired from the capture unit 162, and calculates a position and orientation (exemplary first information) PAbox of the object housing container BOX. The position and orientation PAbox of the object housing container BOX is output to the correction amount calculation unit 272.

(Step S205)
The operation sequence unit 154 outputs the command cmd1 based on a command of causing the hand 108 to contact the object housing container BOX. The trajectory generation unit 156 generates a trajectory for moving the hand 108 toward the object housing container BOX based on the command cmd1. A moving target position of the hand 108 is set at point P1 (see FIG. 13) on the upper end surface of the side plate configuring the object housing container BOX, for example. The servo control unit 158 controls the robot 110 based on the generated trajectory. The hand 108 moves toward the object housing container BOX.

(Step S206)
When the hand 108 moves, the operation sequence unit 154 outputs the command cmd3, and the contact detection unit 270 monitors the force data f. As illustrated in the right side of FIG. 5, when the grip claw 134 of the hand 108 contacts the object housing container BOX, the contact detection unit 270 detects the contact based on the force data f.

When detecting the contact, the contact detection unit 270 outputs a contact detection signal Sd to the operation sequence unit 154. The operation sequence unit 154 stops the moving of the hand 108. That is, the trajectory generation unit 156 generates a trajectory for decelerating and stopping the robot 110, and the servo control unit 158 controls the robot 110 according to the trajectory.

The contact detection unit 270 calculates a contact position of the hand in the robot coordinate system Cr based on the position feedback information Nb of each servo motor when the hand 108 contacts the object housing container BOX.

The contact position of the hand 108 is calculated via the following first procedure and second procedure. In the first procedure, the position feedback information Nb of each servo motor of the robot 110 is subjected to forward kinematics transformation so that a position and orientation of the flange 132 viewed from the robot coordinate system Cr is calculated. In the second procedure, the position of the tip (control point) of the hand 108 viewed from the flange 132 is added to the position and orientation of the flange 132 calculated in the first procedure.

Figure 11:
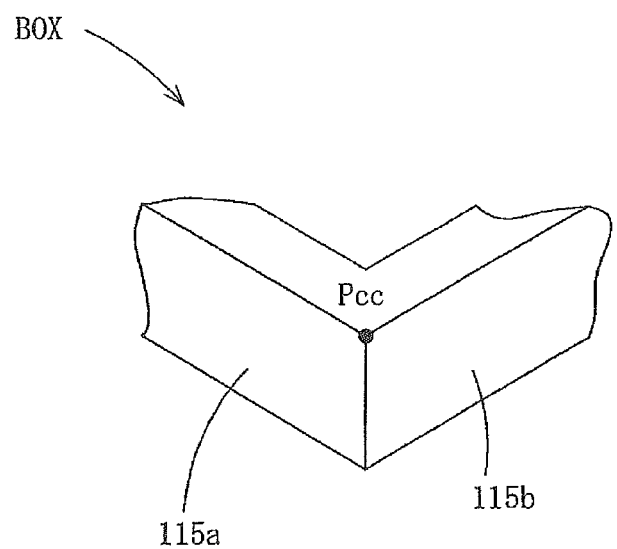
FIG. 11 is an explanatory diagram illustrating an angular point of the object housing container.
Figure 12:
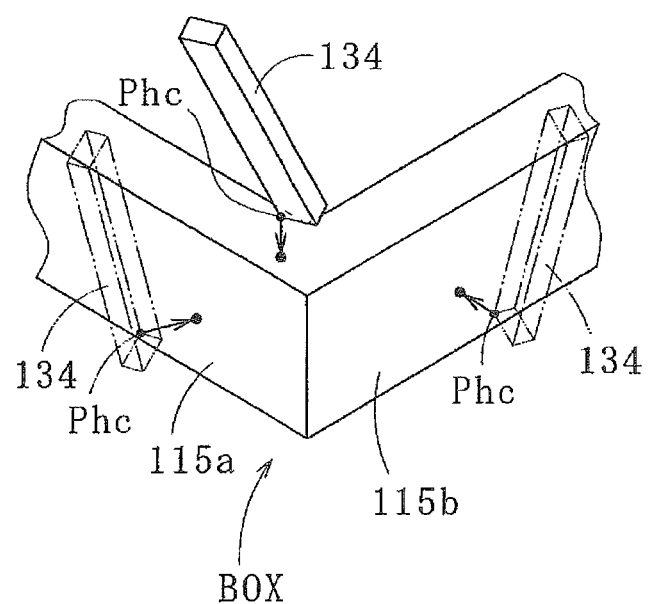
FIG. 12 is an explanatory diagram illustrating a contact operation of a hand of a robot provided in the robot system.
Figure 13:
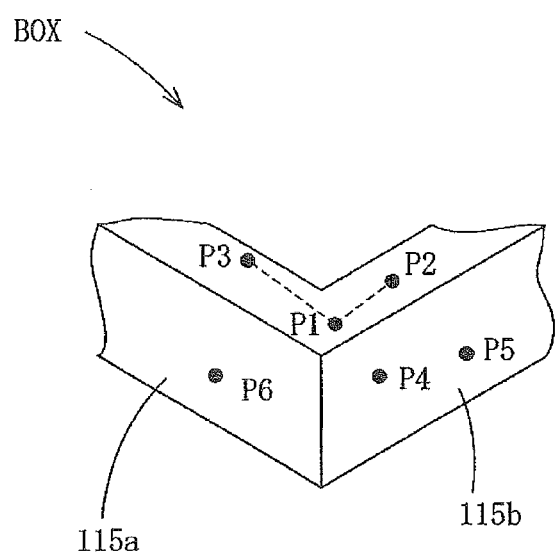
FIG. 13 is an explanatory diagram illustrating exemplary contact points by the hand of the robot provided in the robot system.

(Step S207)
The contact detection unit 270 is fixed on the object housing container BOX and determines whether at least six different contact positions P1 to P6 of the hand 108 illustrated in FIG. 13 are acquired, for example, in order to find a position and orientation of a container coordinate system Cb with an angular point Pee (see FIG. 11) of the object housing container BOX as the origin. As illustrated in FIG. 12, the robot contacts the object housing container BOX at an angular point Phc (exemplary predetermined site of the hand) of the grip claw 134 of the hand 108, for example. When a total of six contact positions are not acquired, the processing returns to step S205 and step S206, where the hand is contacted at a different position on the object housing container BOX. On the other hand, when a total of six contact positions are acquired, the processing proceeds to the next step S208.

(Step S208)

A position and orientation of the container coordinate system Cb described above is calculated from the coordinates of the total of six acquired contact positions (see FIG. 13) P1 to P6, and is assumed as a position and orientation (exemplary second information) PAcnt of the object housing container BOX found by the contact of the hand 108. An exemplary method for calculating the container coordinate system Cb will be described later.

(Step S209)

The correction amount calculation unit 272 calculates a homogenous transformation matrix $^{F}T_{C}$ for expressing a position and orientation of the camera unit 130 viewed from the flange coordinate system Cf fixed on the flange 132 of the robot 110 based on the position and orientation PAcnt of the object housing container BOX found by the contact of the hand 108 and the position and orientation PAbox of the object housing container BOX calculated by the position calculation unit 266 based on the image data in step S204. The homogenous transformation matrix $^{F}T_{C}$ is a correction amount calculation processing result.

Figure 14:
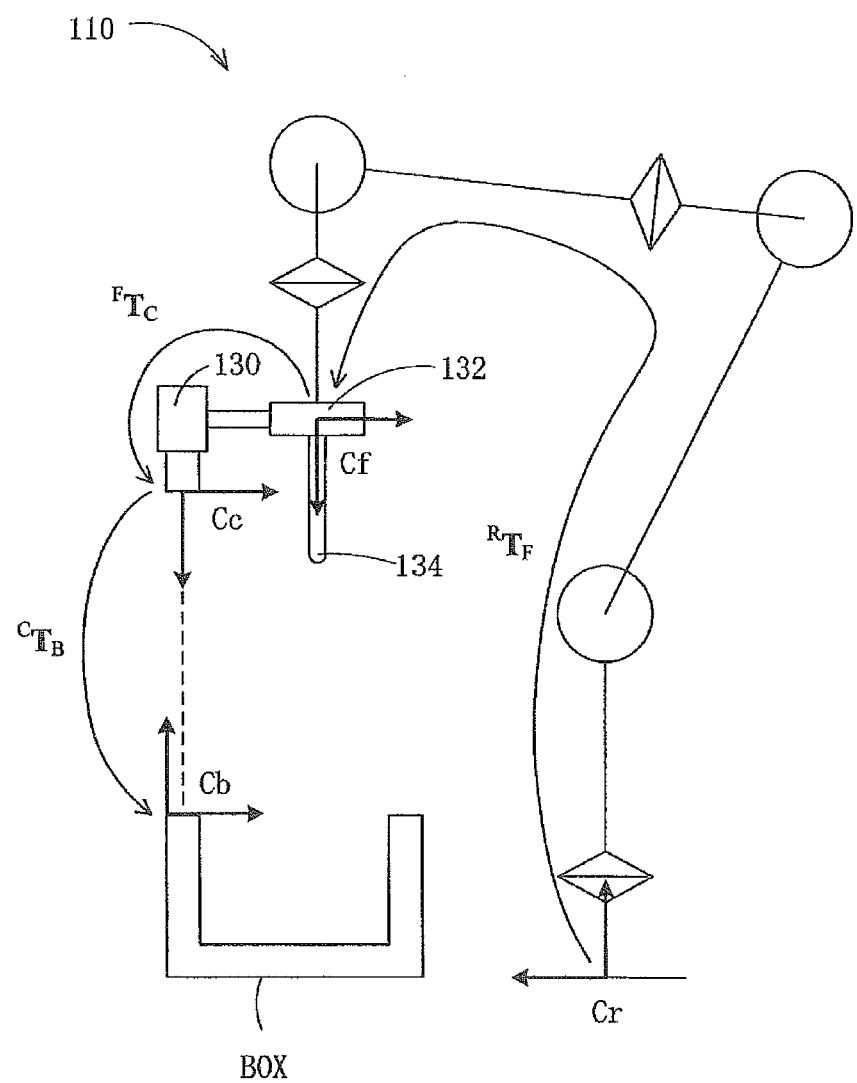
FIG. 14 is an explanatory diagram illustrating a relationship between each coordinate system and a homogenous transformation matrix.

A method for calculating a position and orientation of the camera unit 130 viewed from the flange 132 of the robot 110 (method for calculating the homogenous transformation matrix $^{F}T_{C}$) will be described herein. As illustrated in FIG. 14, the flange coordinate system (coordinate system fixed on the flange 132) Cf viewed from the robot coordinate system Cr is expressed in the homogenous transformation matrix $^{R}T_{F}$, a camera coordinate system (coordinate system fixed on the camera unit 130) Cc viewed from the flange coordinate system Cf is expressed in the homogenous transformation matrix $^{F}T_{C}$, and the container coordinate system (coordinate system fixed on the object housing container BOX) Cb viewed from the camera coordinate system Cc is expressed in the homogenous transformation matrix $^{C}T_{B}$, a product $^{R}T_{B}$ of the matrixes is expressed in the following Equation.

$$^{R}T_{B} = {}^{R}T_{F} \cdot {}^{F}T_{C} \cdot {}^{C}T_{B} \qquad \text{Equation (1)}$$

Figure 7:
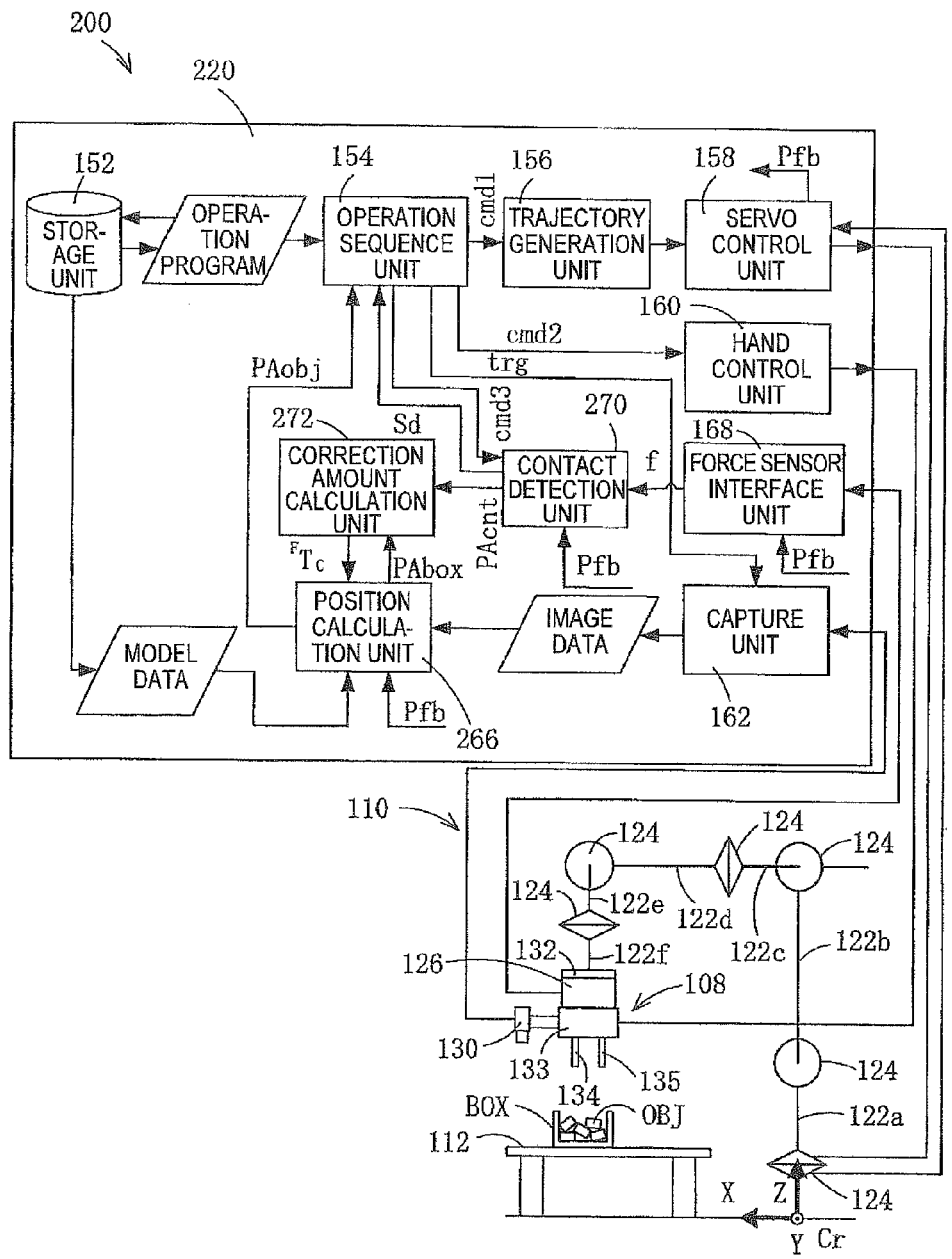
FIG. 7 is a configuration diagram of a robot system according to a second embodiment.
Figure 15:
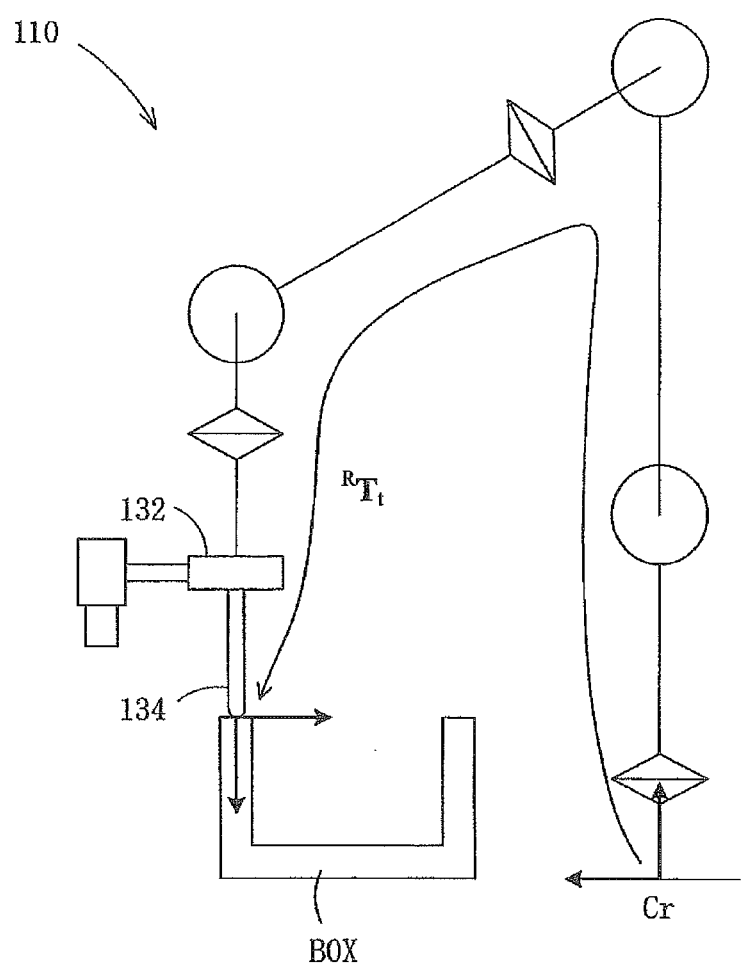
FIG. 15 is an explanatory diagram illustrating a homogenous transformation matrix indicating a position and orientation of the object housing container.

The matrix $^{R}T_{B}$ is directed for transforming the position and orientation PAbox of the object housing container BOX calculated by use of the camera unit 130 into the position and orientation viewed from the robot coordinate system Cr. The robot 110 in FIG. 14 and FIG. 15 is schematically illustrated in order to indicate a relationship between each coordinate system and a homogenous transformation matrix. Thus, the camera unit 130 is fixed on the flange 132. The camera unit 130 may be fixed on the base part 133 of the hand 108 as illustrated in FIG. 7.

Assuming the position and orientation PAcnt of the object housing container BOX calculated by the contact of the hand 108 on the object housing container BOX as a matrix $^{R}T_{t}$ illustrated in FIG. 15, the homogenous transformation matrix $^{F}T_{C}$ is solved assuming that the matrix $^{R}T_{t}$ is equal to the matrix $^{R}T_{B}$ found in Equation (1), and thus the following Equation (2) is obtained.

$$^{F}T_{C} = ({}^{R}T_{F})^{-1} \cdot {}^{R}T_{t} \cdot ({}^{C}T_{B})^{-1} \qquad \text{Equation (2)}$$

In Equation (2), the subscript (−1) on the right shoulder indicates an inverse matrix of the matrix in brackets. The homogenous transformation matrix $^{F}T_{C}$ is a correction amount calculation processing result. That is, if the homogenous transformation matrix $^{R}T_{F}$, the homogenous transformation matrix $^{R}T_{t}$ and the homogenous transformation matrix $^{C}T_{B}$ each are found, the position and orientation (homogenous transformation matric $^{F}T_{C}$) of the camera unit 130 viewed from the flange coordinate system Cf is determined. Herein, the homogenous transformation matrix $^{R}T_{F}$ expresses the position and orientation of the flange 132 viewed from the robot coordinate system Cr when the camera unit 130 shoots the object housing container BOX in step S202. The homogenous transformation matrix $^{R}T_{t}$ expresses the position and orientation PAcnt of the object housing container BOX viewed from the robot coordinate system Cr calculated by the contact of the hand 108 on the object housing container BOX found in step S208. The homogenous transformation matrix $^{C}T_{B}$ expresses the position and orientation PAbox of the object housing container BOX calculated from the image data found in step S204.

In the subsequent object grip operation illustrated in FIG. 3, the correction position calculation unit 266b in the position calculation unit 266 illustrated in FIG. 8 uses the homogenous transformation matrix $^{F}T_{C}$ to transform the information on the position and orientation of the object OBJ calculated by the image processing unit 266a from the image data of the camera unit 130 into the information on the position and orientation viewed from the robot coordinate system Cr in Equation (1).

A method for calculating the position and orientation of the container coordinate system Cb in step S208 described above will be described below in detail. In the following description, the points at the contact positions P1 to P6 of the hand 108 may be denoted as points P1 to P6, respectively. The position and orientation of the container coordinate system Cb is calculated in the following calculation steps Sc1 to Sc3.

(Calculation step Sc1)

Figure 16:
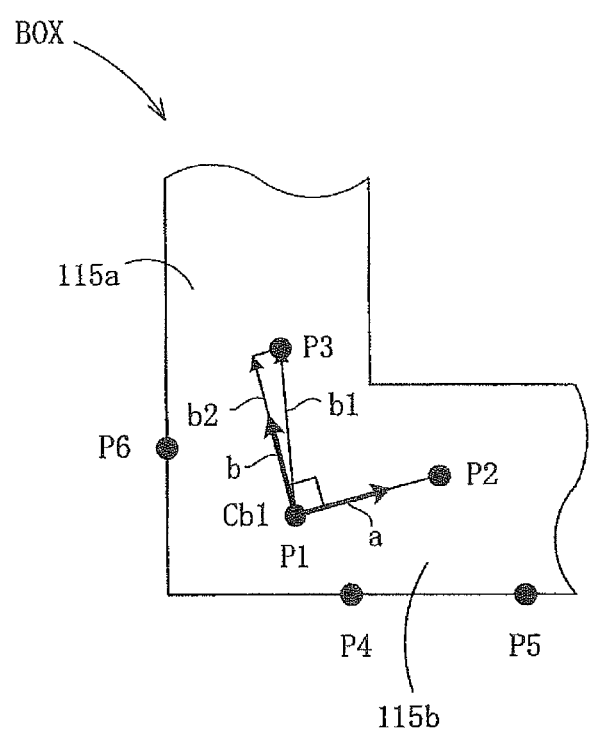
FIG. 16 is a top view of the object housing container indicating a first coordinate system in the correction amount calculation processing of the robot system.

In step Sc1, the three points P1, P2 and P3 positioned on the upper end surface of the side plates 115a and 115b of the object housing container BOX are used to find a first coordinate system Cb1 with the point P1 as the origin as illustrated in FIG. 16. Specifically, the following procedures will be performed.

(Procedure 1)

A unit vector a from the point P1 toward the point P2 is found in the following Equation.

$$a = (P2 - P1)/|P2 - P1| \qquad \text{Equation (3)}$$

(Procedure 2)

A vector b1 from the point P1 toward the point P3 is found in the following Equation.

$$b1 = P3 - P1 \qquad \text{Equation (4)}$$

(Procedure 3)

A vector b2 which is a component forming a right angle with the unit vector a of the vector b1 is found in the following Equation.

$$b2 = b1 - (b1 \cdot a)a \qquad \text{Equation (5)}$$

(Procedure 4)

A unit vector b of the vector b2 is found in the following Equation.

$$b = b2/|b2| \qquad \text{Equation (6)}$$

(Procedure 5)

A unit vector c as the cross product of the unit vector a and the unit vector b is found in the following Equation.

$$c = a \times b \qquad \text{Equation (7)}$$

A coordinate system with the point P1 as the origin is defined as the first coordinate system Cb1 assuming the found unit vector a, unit vector b and unit vector c as the X axis, the Y axis, and the Z axis, respectively. The first coordinate system Cb1 is expressed as a coordinate system viewed from the robot coordinate system Cr in a homogenous transformation matrix $^R T_1$ in the following Equation.

$$^R T_1 = \begin{bmatrix} a & b & c & P_1 \\ 0 & 0 & 0 & 1 \end{bmatrix} \quad \text{Equation (8)}$$

where $P_1$ is a position vector of P1 viewed from the robot coordinate system Cr.

(Calculation Step Sc2)

Figure 18:
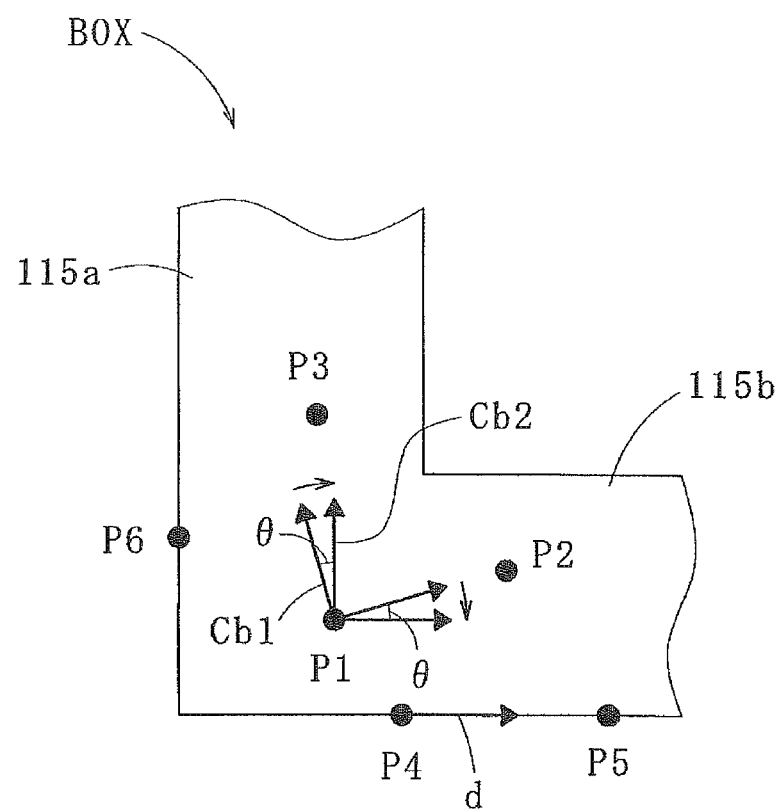
FIG. 18 is an explanatory diagram illustrating a second coordinate system in the correction amount calculation processing of the robot system.

In step Sc2, as illustrated in FIG. 18, a vector defined by use of the point P4 and the point P5 positioned on the surface of the side plate of the object housing container BOX is used to adjust the X axis direction of the first coordinate system Cb1 (unit vector a direction) to the side direction of the object housing container BOX. Specifically, the following procedures will be performed.

(Procedure 1)

Figure 17:
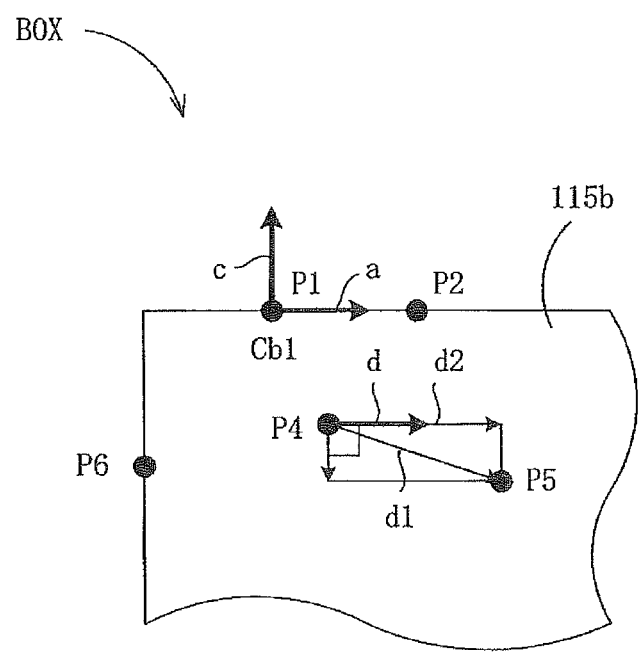
FIG. 17 is a side view of the object housing container indicating the first coordinate system viewed at a different angle from FIG. 16 in the correction amount calculation processing of the robot system.

As illustrated in FIG. 17, a vector d1 from the point P4 toward the point P5 is found in the following Equation.

$$d1 = P5 - P4 \quad \text{Equation (9)}$$

(Procedure 2)

A vector d2 which is a component of the vector d1 forming a right angle with the unit vector c is found in the following Equation.

$$d2 = d1 - (d1 \cdot c)c \quad \text{Equation (10)}$$

(Procedure 3)

A unit vector d of d2 is found in the following Equation.

$$d = d2/|d2| \quad \text{Equation (11)}$$

(Procedure 4)

An angle $\alpha$ formed between the unit vector a and the unit vector d is found in the following Equation.

$$\alpha = \cos^{-1}((a \cdot d)/(|a||d|)) \quad \text{Equation (12)}$$

(Procedure 5)

A rotation angle $\theta$ by which the first coordinate system Cb1 is rotated around the Z axis (around the unit vector c) is found in the following Equation.

$$\text{If}((a \times d) \cdot c) > 0 \text{ is established, } \theta = \alpha \quad \text{Equation (13a)}$$

$$\text{If}((a \times d) \cdot c) < 0 \text{ is established, } \theta = -\alpha \quad \text{Equation (13b)}$$

(Procedure 6)

A coordinate system which is the rotated first coordinate system Cb1 is defined as a second coordinate system Cb2. The second coordinate system Cb2 is expressed as a coordinate system viewed from the robot coordinate system Cr in a homogenous transformation matrix $^R T_2$ in the following Equation.

$$^R T_2 = {}^R T_1 \cdot \begin{bmatrix} R_z(\theta) & \begin{matrix} 0 \\ 0 \\ 0 \end{matrix} \\ 0 \ 0 \ 0 & 1 \end{bmatrix} \quad \text{Equation (14)}$$

where $R_z(\theta)$ is the following 3×3 matrix expressing the rotation around the Z axis.

$$R_z(\theta) = \begin{bmatrix} \cos\theta & -\sin\theta & 0 \\ \sin\theta & \cos\theta & 0 \\ 0 & 0 & 1 \end{bmatrix} \quad \text{Equation (15)}$$

(Calculation step Sc3)

Figure 19:
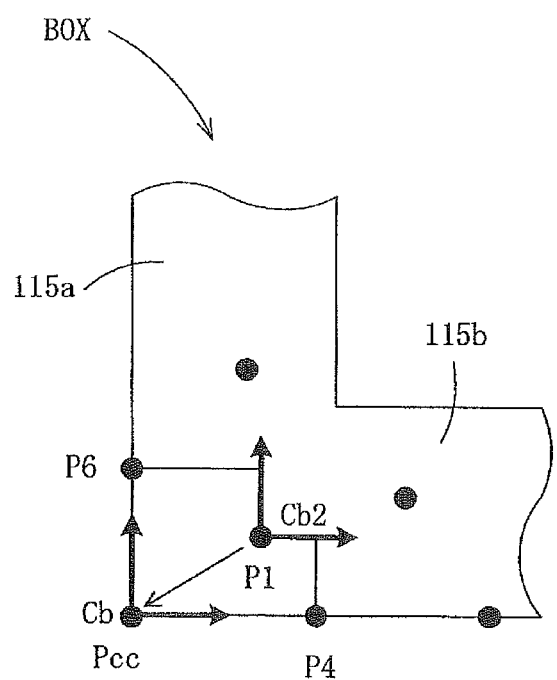
FIG. 19 is an explanatory diagram illustrating a container coordinate system in the correction amount calculation processing of the robot system.

In step Sc3, as illustrated in FIG. 19, the point P4 and the point P6 positioned on the surfaces of the side plate 115b and the side plate 115a of the object housing container BOX, respectively, are used to adjust the origin P1 of the second coordinate system Cb2 to the angular point Pcc of the object housing container BOX, thereby finding a container coordinate system Cb. Specifically, the following procedures will be performed.

(Procedure 1)

The point P4 is transformed into a position vector $^2 P_4$ viewed from the second coordinate system Cb2.

$$^2 P_4 = (^R T_2)^{-1} \cdot {}^R P_4 = \begin{bmatrix} ^2 P_{4x} \\ ^2 P_{4y} \\ ^2 P_{4z} \end{bmatrix} \quad \text{Equation (16)}$$

where $^R P_4$ is a position vector of P4 viewed from the robot coordinate system Cr. $^2 P_{4x}$, $^2 P_{4y}$, and $^2 P_{4z}$ are the x, y and z components of the position vector $^2 P_4$ viewed from the second coordinate system Cb2, respectively.

(Procedure 2)

The point P6 is transformed into a position vector $^2 P_6$ viewed from the second coordinate system Cb2.

$$^2 P_6 = (^R T_2)^{-1} \cdot {}^R P_6 = \begin{bmatrix} ^2 P_{6x} \\ ^2 P_{6y} \\ ^2 P_{6z} \end{bmatrix} \quad \text{Equation (17)}$$

where $^R P_6$ is a position vector of P6 viewed from the robot coordinate system Cr. $^2 P_{6x}$, $^2 P_{6y}$, and $^2 P_{6z}$ are the x, y and z components of the position vector $^2 P_6$ viewed from the second coordinate system Cb2, respectively.

A coordinate system as the translated second coordinate system Cb2 is assumed as container coordinate system Cb. The container coordinate system Cb is expressed as a coordinate system viewed from the robot coordinate system Cr in a homogenous transformation matrix $^R T_3$ in the following Equation.

$$^R T_3 = {}^R T_2 \cdot \begin{bmatrix} I_3 & \begin{matrix} ^2 P_{6x} \\ ^2 P_{4y} \\ 0 \end{matrix} \\ 0\ 0\ 0 & 1 \end{bmatrix} = \begin{bmatrix} ^R R_3 & ^R P_3 \\ 0\ 0\ 0 & 1 \end{bmatrix} \quad \text{Equation (18)}$$

where $I_3$ is a 3×3 unit matrix.

The $^R P_3$ as a calculation result is the origin of the container coordinate system Cb, or a coordinate of the angular point Pcc of the object housing container BOX.

When the outer shape of the object housing container BOX is not an ideal cuboid, each face is defined by not six points but three points, and a position of the coordinate system may be determined along a side where the faces cross each other.

As described above, the robot system 200 according to the present embodiment can take an object from the object housing container BOX even if an error is in a position of the object OBJ acquired from a stereo image shot by the camera unit 130 and an error is in a position and orientation of the camera unit 130 viewed from the robot coordinate system Cr. At this time, for example, a dedicated object to be calibrated, where a checkered pattern or asymmetric graphic is drawn, is not required.

Third Embodiment

Subsequently, a robot system 300 according to a third embodiment will be described. The same constituents and operation steps as those in the robot systems according to the first and second embodiments are denoted with the same reference numerals, and a detailed description thereof may be omitted.

Figure 20:
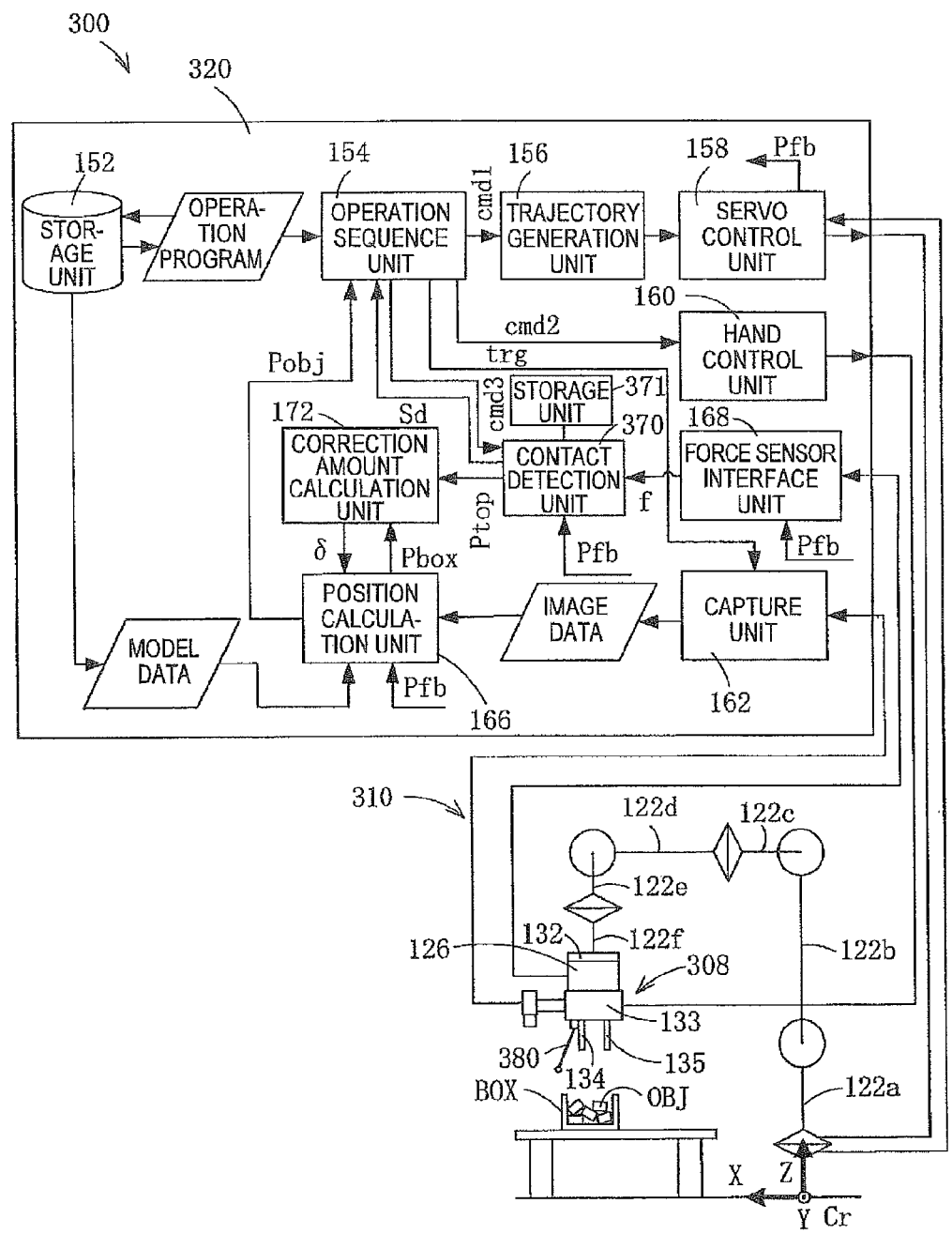
FIG. 20 is a configuration diagram of a robot system according to a third embodiment.

A hand 308 provided in a robot 310 in the robot system 300 is different from the hand 108 according to the first embodiment in that it further includes a contact detection probe (exemplary contact detection member) 380 contacting the object housing container BOX as illustrated in FIG. 20. When contacting an object, the contact detection probe 380 extending from the base part 133 may elastically deform at least in one direction out of the first direction as the longitudinal direction of the contact detection probe 380, the second direction crossing with the first direction, and the third direction crossing with the first and second directions. The contact detection probe 380 is configured of an elastic body, for example.

Figure 22:
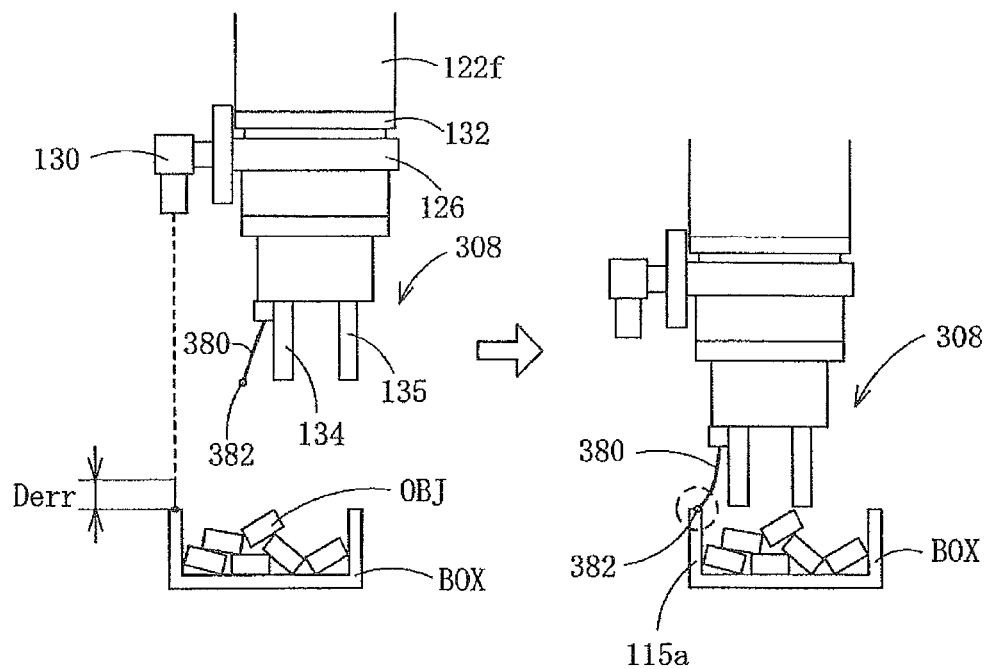
FIG. 22 is an explanatory diagram illustrating an operation in correction amount calculation processing by a robot provided in the robot system.

A spherical part 382 having a spherical shape is formed at the tip of the contact detection probe 380 as illustrated in the left side of FIG. 22. The length and longitudinal orientation of the contact detection probe 380 are set such that the hand 308 or the links 122a to 122f of the robot 310 do not interfere with the object housing container BOX when contacting the object housing container BOX. The contact detection probe 380 can be detached from the hand 308. The contact detection probe 380 may be accommodated in the hand 308 when not in use in order not to lose the workability of the robot 310.

A contact detection unit 370 in a robot control device 320 illustrated in FIG. 20 monitors the force data f at a predetermined cycle, and detects that the contact detection probe 380 contacts an object. The contact detection unit 370 stores the position of the tip of the contact detection probe 380, and the force data f in a storage unit 371.

Figure 21:
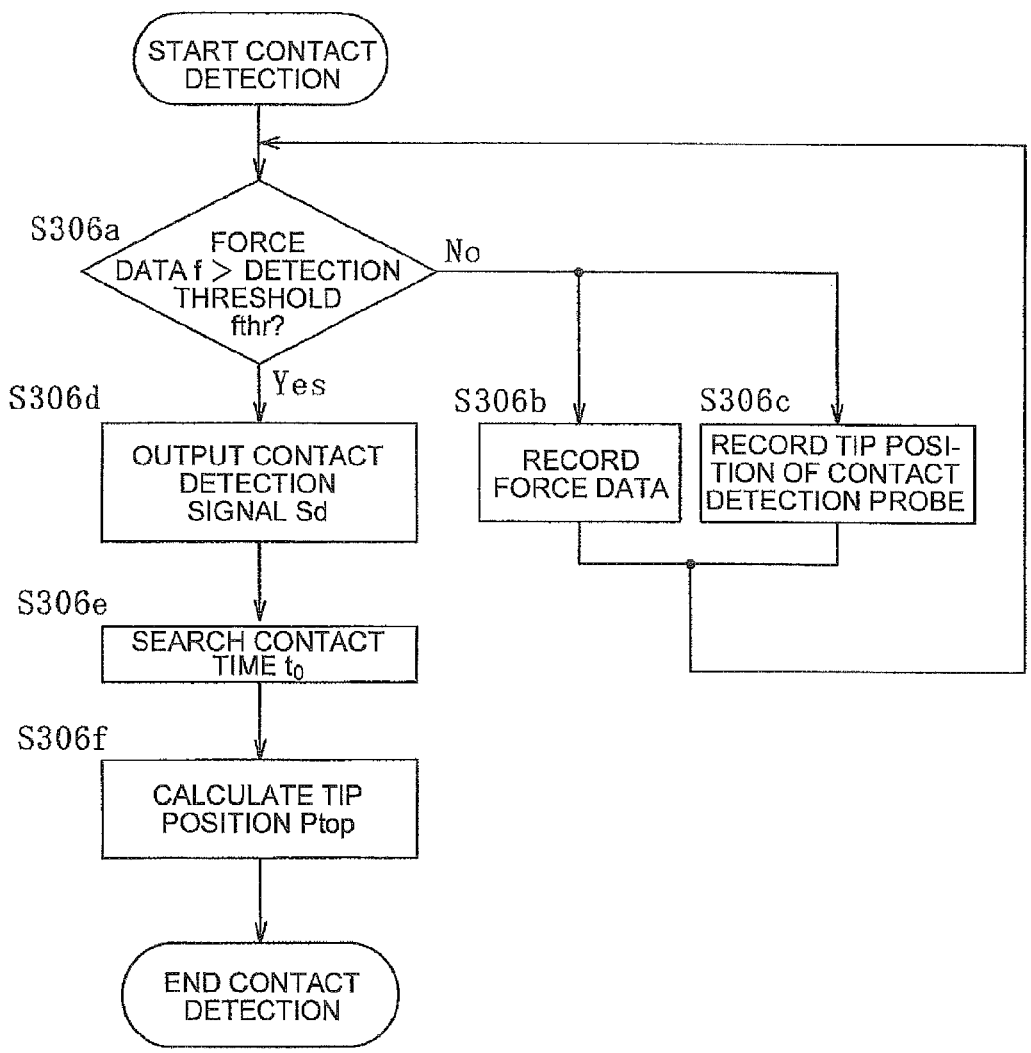
FIG. 21 is a flowchart illustrating a contact detection operation of a robot control device provided in the robot system.

The operations of the robot system 300 (method for controlling the robot) will be described below. They are different from the operations of the robot system 100 according to the first embodiment particularly in the contact detection operation, and thus the contact detection operation will be mainly described. At first, the robot system 300 performs steps S101 to S104 illustrated in FIG. 4. That is, as illustrated in the left side of FIG. 22, the camera unit 130 in the robot 310 is positioned to a position at which the object housing container BOX is shot, and the position Pbox of the object housing container BOX is output to the correction amount calculation unit 172 based on the shot stereo image. Thereafter, the hand 308 in the robot 310 moves toward the object housing container BOX (step S105 is performed), and additionally the contact detection operation illustrated in FIG. 21 is performed. The contact detection operation is performed according to the following steps.

(Step S306a)

As illustrated in FIG. 21, the contact detection unit 370 monitors the force data f output from the force sensor interface unit 168, and determines whether the value of the force data f exceeds a preset detection threshold fthr. When the value of the force data f does not exceed the detection threshold fthr, the processing proceeds to step S306b and step S306c. On the other hand, as illustrated in the right side of FIG. 22, when the contact detection probe 380 contacts the object housing container BOX and the value of the force data f exceeds the detection threshold fthr (at time t0 illustrated in FIG. 24), the processing proceeds to step S306d.

(Step S306b)

Figure 24:
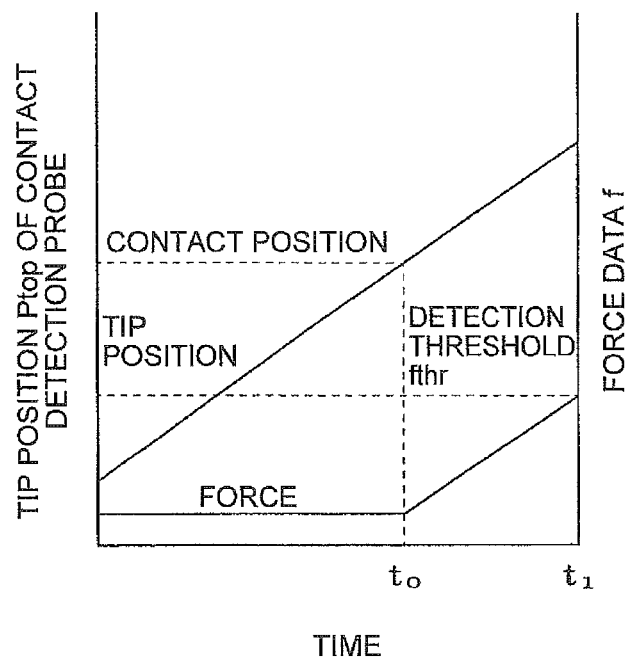
FIG. 24 illustrates exemplary data stored in a contact detection unit of the robot control device provided in the robot system.

The contact detection unit 370 stores the force data f in the storage unit 371. The storage processing is performed by writing (overwriting) the force data f in a first ring buffer region provided in the storage unit 371. Exemplary force data f stored in the storage unit 371 is illustrated in FIG. 24. The transverse axis in FIG. 24 indicates a time. The right longitudinal axis indicates force data f.

(Step S306c)

In parallel with step S306b, the contact detection unit 370 calculates a 3D tip position (which may be simply denoted as "tip position" below) Ptop of the contact detection probe 380, and stores the calculated tip position Ptop in the storage unit 371. The storage processing is performed by writing (overwriting) the tip position Ptop in a second ring buffer region provided in the storage unit 371. Exemplary tip position Ptop stored in the storage unit 371 is illustrated in FIG. 24. FIG. 24 illustrates only a position in the height direction of the tip position Ptop. The tip position Ptop may be assumed as the center position of the spherical part 382 formed at the tip of the contact detection probe 380 for convenience.

The tip position Ptop of the contact detection probe 380 is calculated via the first procedure and the second procedure. In the first procedure, the position feedback information Nb of each servo motor in the robot 310 is subjected to forward kinematics transformation so that a position and orientation of the flange 132 viewed from the robot coordinate system Cr is calculated. In the second procedure, the position of the tip of the contact detection probe 380 viewed from the flange 132 is added to the position and orientation of the flange 132 calculated in the first procedure.

An exemplary tip position Ptop in the height direction stored in the storage unit 371 is illustrated in FIG. 24. The tip position Ptop illustrated in FIG. 24 is a calculated tip position, and does not intend to indicate an actual tip position of the contact detection probe. Thus, the tip position Ptop changes after time t0 when the object housing container BOX is contacted.

The tip position of the contact detection probe 380 (the center position of the spherical part 382 formed at the tip of the contact detection probe 380) Ptop described above is different from an actual contact position where the contact detection probe 380 contacts the object housing container BOX. In order to detect a contact position with a higher accuracy, the radius R of the spherical part 382 may be added to the center position Ptcp of the spherical part 382 to be assumed as a tip position Ptop of the contact detection probe 380. Specifically, the tip position Ptop ($^R$[xtop ytop ztop]) is calculated for the following cases 1 to 6 according to an approach direction of the contact detection probe 380.

(Case 1) Approach from the negative direction toward the positive direction in the X axis $$^R[xtop\ ytop\ ztop] = {^R}[xtcp\ ytcp\ ztcp] + [R\ 0\ 0] \qquad \text{Equation (19a)}$$

(Case 2) Approach from the positive direction toward the negative direction in the X axis $$^R[xtop\ ytop\ ztop] = {^R}[xtcp\ ytcp\ ztcp] + [-R\ 0\ 0] \qquad \text{Equation (19b)}$$

(Case 3) Approach from the negative direction toward the positive direction in the Y axis $$^R[\text{xtop ytop ztop}] = ^R[\text{xtcp ytcp ztcp}] + [0\ R\ 0] \quad \text{Equation (19c)}$$

(Case 4) Approach from the positive direction toward the negative direction in the Y axis $$^R[\text{xtop ytop ztop}] = ^R[\text{xtcp ytcp ztcp}] + [0\ -R\ 0] \quad \text{Equation (19d)}$$

(Case 5) Approach from the negative direction toward the positive direction in the Z axis $$^R[\text{xtop ytop ztop}] = ^R[\text{xtcp ytcp ztcp}] + [0\ 0\ R] \quad \text{Equation (19e)}$$

(Case 6) Approach from the positive direction toward the negative direction in the Z axis $$^R[\text{xtop ytop ztop}] = ^R[\text{xtcp ytcp ztcp}] + [0\ 0\ -R] \quad \text{Equation (19l)}$$

When the approach does not apply to any of the cases 1 to 6, a direction in which the movement amount of the contact detection probe 380 is large may be calculated as an approach direction. This case has less effects on the accuracy. For example, when the approach operation is such that the tip position moves by 200 mm from the negative direction toward the positive direction in the X axis and by 10 mm from the positive direction toward the negative direction in the Y axis, the former moves more than the latter, and thus the tip position Ptop of the contact detection probe 380 is calculated according to Equation (19a) indicated in Case 1 (approach from the negative direction toward the positive direction in the X axis).

(Step S306d)

Figure 25:
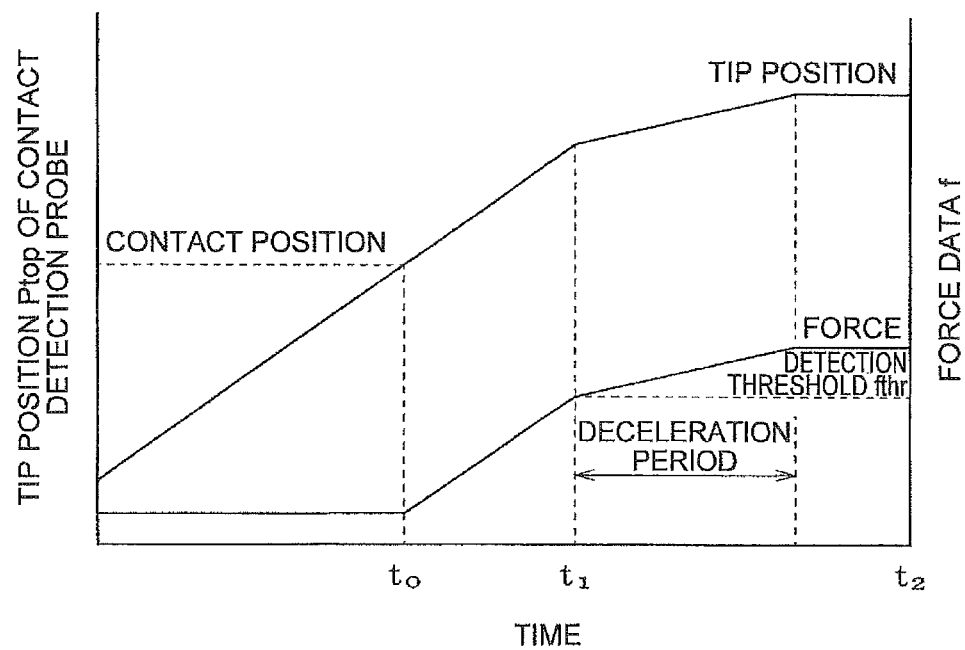
FIG. 25 illustrates exemplary force data and an exemplary tip position in the height direction of a contact detection probe when the robot system performs the contact detection operation.

The contact detection unit 370 transmits a contact detection signal Sd to the operation sequence unit 154. The operation sequence unit 154 decelerates and stops the robot 310. That is, the trajectory generation unit 156 generates a trajectory for decelerating and stopping the robot 310. The servo control unit 158 controls the robot 310 according to the trajectory (see time t1 to time t2 in FIG. 25).

(Step S306e)

The contact detection unit 370 finds the time t0 when the contact detection probe 380 contacts the object housing container BOX from the force data f stored in the storage unit 371. The time t0 is when a change rate relative to an elapsed time of the force data f changes equal to or more than a preset magnitude (when the force data f largely rises) as illustrated in FIG. 24.

(Step S306f)

The contact detection unit 370 calculates the tip position Ptop of the contact detection probe 380 at time t0 as a contact position Pcnt.

Figure 23:
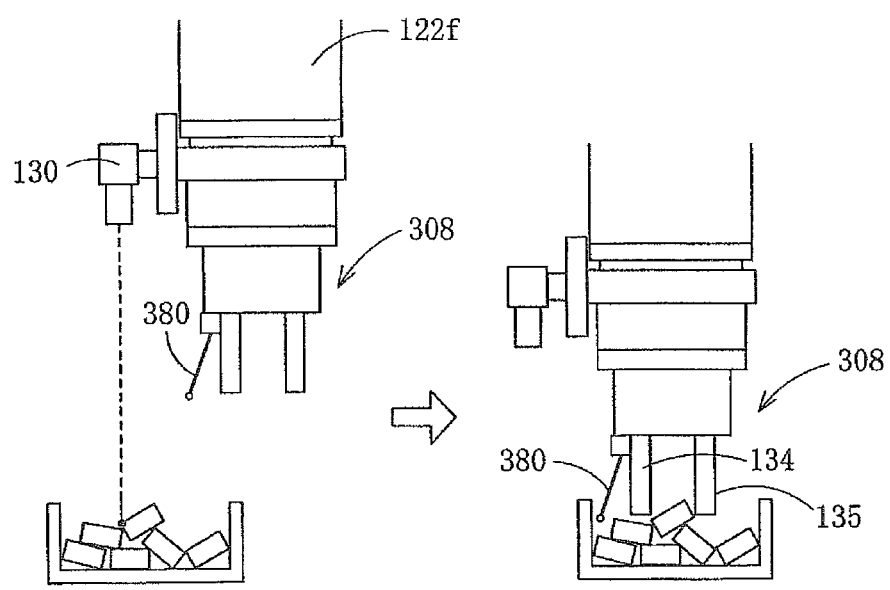
FIG. 23 is an explanatory diagram illustrating an object grip operation by the robot provided in the robot system.

Subsequently, the robot system 300 performs steps S107 to S114 illustrated in FIG. 4. That is, as illustrated in the left side of FIG. 23, the robot system 300 positions the camera unit 130 in the robot 310 to a shooting position of the object OBJ, and then positions the hand 308 in the robot 310 to a position at which the object OBJ is gripped as illustrated in the right side of FIG. 23. When the hand 308 is positioned, the robot 310 can take the object OBJ.

As described above, the robot system 300 according to the present embodiment contacts the object housing container BOX by use of the elastic contact detection probe 380, and thus a speed to contact the object housing container BOX can be higher than when the grip claw 134 of the hand 308 is used to contact the object housing container BOX. Consequently, a time required for the correction amount calculation processing can be further reduced. The hand according to the present embodiment may be used for the method for controlling a robot according to the second embodiment.

Fourth Embodiment

Subsequently, a robot system according to a fourth embodiment will be described. The same constituents and operation steps as those in the robot systems 100, 200 and 300 according to the first to third embodiments are denoted with the same reference numerals, and thus a detailed description thereof may be omitted. The robot system according to the present embodiment is different from the robot system 300 according to the third embodiment in the grip claws of the robot.

Figure 26:
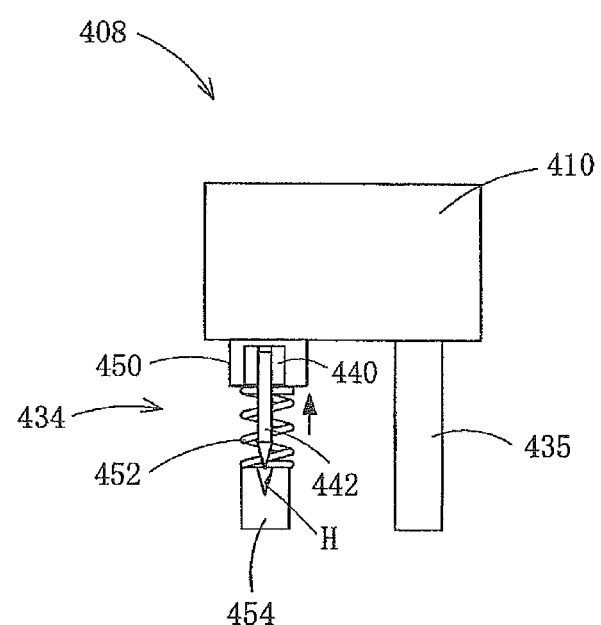
FIG. 26 is an explanatory diagram illustrating a state where a pin is retracted in a hand of a robot provided in a robot system according to a fourth embodiment.

A hand 408 provided in a robot in the robot system according to the present embodiment has a base part 410 attached to the force sensor 126, and a pair of grip claws 434 and 435 extending from the base part 410 toward the tip as illustrated in FIG. 26.

One grip claw 434 in the pair of grip claws 434 and 435 has a fixing part 450, a coil spring 452, and a grip part 454. The grip claw 434 includes a slider mechanism (exemplary advance/retraction mechanism) 440, and a pin 442.

The fixing part 450 is provided at the tip of the base part 410. The slider mechanism 440 is accommodated inside the fixing part 450.

The coil spring 452 is fixed at one end to the fixing part 450.

The grip part 454 is fixed at the other end of the coil spring 452. The grip part 454 contacts the object OBJ, and grips the object OBJ together with the other grip claw 435. A hole H is formed on the face opposite to the fixing part 450 of the grip part 454.

Figure 27:
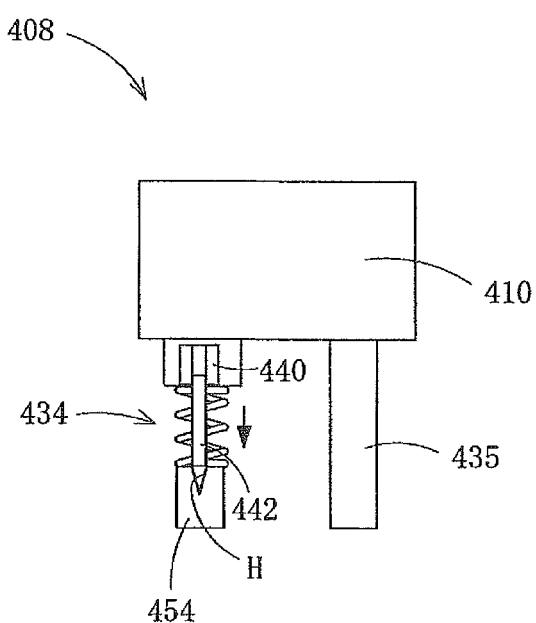
FIG. 27 is an explanatory diagram illustrating a state where a pin is advanced in the hand of the robot provided in the robot system.

The slider mechanism 440 is provided inside the fixing part 450 as described above. The slider mechanism 440 advances or retracts the pin 442 in the tip direction. The pin 442 is arranged inside the coil spring 452. The pin 442 is driven by the slider mechanism 440 thereby to advance and retract in the tip direction and in its opposite direction as illustrated in FIG. 26 and FIG. 27. The pin 442 is a rod-shaped member, for example. The tip of the pin 442 is gradually tapered toward the tip direction. The tip has a shape corresponding to the shape of the hole H to be fit into the hole H formed at the grip part 454. Any shape of the tip may be employed to be fit into the hole H. An exemplary rigidity change mechanism is configured of the fixing part 450, the coil spring 452, the grip part 454, the pin 442 and the slider mechanism 440.

As illustrated in FIG. 26, when the pin 442 driven by the slider mechanism 440 retracts, the grip part 454 is fixed on the fixing part 450 via the coil spring 452. On the other hand, as illustrated in FIG. 27, when the pin 442 driven by the slider mechanism 440 advances, the pin 442 is fit into the hole H and the grip part 454 is fixed on the fixing part 450 via the coil spring 452 and the pin 442. Thus, rigidity of the grip claw 434 is higher when the pin 442 advances than when it retracts, and thus the rigidity of the grip claw 434 changes depending on advance/retraction of the pin 442.

The hand control unit 160 provided in the robot control device controls a motor (not illustrated) for driving the grip claws 434 and 435 of the hand 408 based on the command cmd2 output from the operation sequence unit 154, thereby opening and closing the grip claws 434 and 435 as illustrated in FIG. 1. The hand control unit controls the operations of the slider mechanism 440 based on the command cmd2 output from the operation sequence unit 154.

Figure 28:
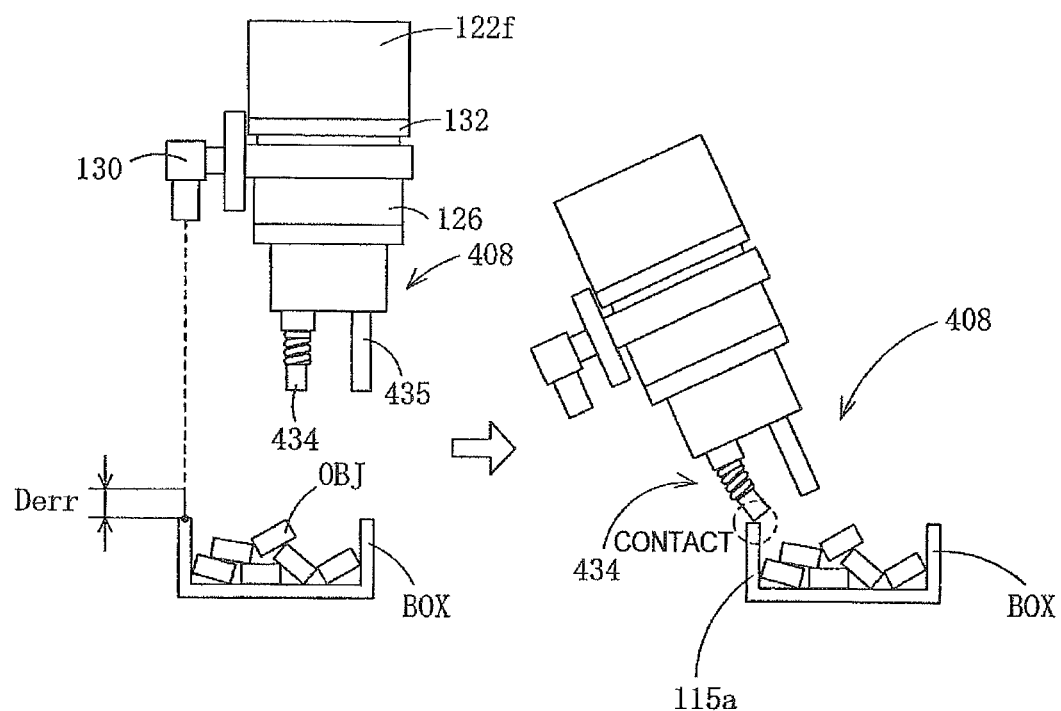
FIG. 28 is an explanatory diagram illustrating an operation in correction amount calculation processing by the robot provided in the robot system.

The operations of the robot system (method for controlling the robot) will be described below. At first, the robot system performs steps S101 to S104 illustrated in FIG. 4. That is, as illustrated in the left side of FIG. 28, the camera unit 130 in the robot is positioned to a position at which the object housing container BOX is shot, and the position Pbox of the object housing container BOX is output to the correction amount calculation unit 172 based on the shot stereo image. The robot system then performs the following operations.

(Step S405a)

The hand control unit 160 operates the slider mechanism 440 based on the command cmd2 from the operation sequence unit 154, thereby retracting the pin 442. Consequently, the rigidity of the grip claw 434 is lowered.

(Step S405b)

The operation sequence unit 154 outputs the command cmd1 based on a command of causing the hand 408 to contact the object housing container BOX. The trajectory generation unit 156 generates a trajectory for moving the hand 408 to contact the upper end surface of the side plate 115a (see FIG. 10) configuring the object housing container BOX, for example, based on the command cmd1. The servo control unit 158 controls the robot based on the generated trajectory. The hand 408 moves toward the object housing container BOX.

The hand 408 in the robot moves toward the object housing container BOX, and at the same time, the contact detection operation is performed. The contact detection operation is performed in the following steps. The contact detection operation is substantially the same as the contact detection operation according to the third embodiment.

(Step S406a)

The contact detection unit 370 monitors the force data f output from the force sensor interface unit 168, and determines whether the value of the force data f exceeds a preset detection threshold fthr. When the value of the force data f does not exceed the detection threshold fthr, the processing proceeds to step S406b described later. On the other hand, as illustrated in the right side of FIG. 28, when the grip claw 434 contacts the object housing container BOX and the value of the force data f exceeds the detection threshold fthr, the processing proceeds to step S406d described later.

(Step S406b)

The contact detection unit 370 stores the force data f in the storage unit 371. The storage processing is performed by writing (overwriting) the force data in the first ring buffer region provided in the storage unit 371.

(Step S406c)

In parallel with step S406b, the contact detection unit 370 calculates a tip position of the grip claw 434, and stores the calculated tip position of the grip claw 434 in the storage unit 371. The storage processing is performed by writing (overwriting) the tip position of the grip claw 434 in the second ring buffer region provided in the storage unit 371.

The tip position of the grip claw 434 is calculated via the first procedure and the second procedure. In the first procedure, the position feedback information Pfb of each servo motor of the robot is subjected to forward kinetics transformation so that a position and orientation of the flange 132 viewed from the robot coordinate system Cr is calculated. In the second procedure, the position of the tip of the grip claw 434 viewed from the flange 132 is added to the position and orientation of the flange 132 calculated in the first procedure.

(Step S406d)

The contact detection unit 370 transmits a contact detection signal Sd to the operation sequence unit 154. The operation sequence unit 154 decelerates and stops the robot. That is, the trajectory generation unit 156 generates a trajectory for decelerating and stopping the robot. The servo control unit 158 controls the robot according to the trajectory.

(Step S406e)

The contact detection unit 370 finds time t0 when the grip claw 434 contacts the object housing container BOX from the force data f stored in the storage unit 371. The time t0 is when a change rate relative to an elapsed time of the force data f changes equal to or more than a preset magnitude.

(Step S406f)

The contact detection unit 370 calculates the tip position of the grip claw 434 at time t0 as a contact position Pcnt.

Figure 29:
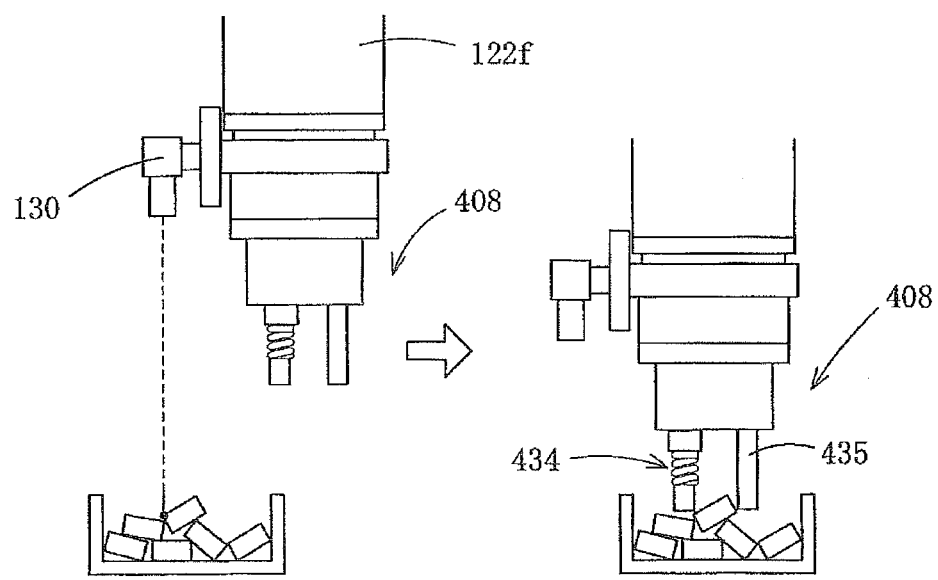
FIG. 29 is an explanatory diagram illustrating an object grip operation by the robot provided in the robot system.

Subsequently, the robot system performs steps S107 to S112 illustrated in FIG. 4. That is, as illustrated in the left side of FIG. 29, the camera unit 130 in the robot is positioned to shoot the object OBJ, and then the hand 408 in the robot is positioned to a position at which the object OBJ is gripped as illustrated in the right side of FIG. 29. The robot system further performs the following steps.

(Step S413a)

The hand control unit operates the slider mechanism 440 to advance the pin 442 based on the command cmd2 from the operation sequence unit 154. Consequently, the rigidity of the grip claw 434 increases.

(Step S413b)

The operation sequence unit 154 analyzes the at least one operation program, and outputs the command cmd2 based on a close command of closing the grip claws 434 and 435. The hand control unit 160 controls a motor for driving the grip claws 434 and 435 of the hand 408 based on the command cmd2. Consequently, the grip claws 434 and 435 are closed so that the hand 408 grips the object OBJ.

(Step S414)

The operation sequence unit 154 outputs the command cmd1 based on a command of lifting the hand 408. The trajectory generation unit 156 generates a trajectory for lifting the hand 408 based on the command cmd1 from the operation sequence unit 154. The servo control unit 158 controls the robot based on the generated trajectory. Consequently, the robot moves the hand 408 upward so that the robot can take the object OBJ.

Other exemplary rigidity change mechanism may be a mechanism for changing rigidity of the grip claw by generating an absorption force between the grip part 454 and the fixing part 450 by an electromagnet, air, ER fluid or MR fluid and changing a strength of the absorption force. The hand according to the present embodiment may be used for the method for controlling a robot according to the second embodiment.

The present invention is not limited to the above embodiments, and may be changed within the scope of the present invention. For example, some or all of the above embodiments or variants may be combined thereby to configure the present invention within the technical scope of the present invention.

A robot control device according to one embodiment of this disclosure includes a control unit moving a hand of a robot toward a container housing an object therein, and causing the hand to contact the container; a contact detection unit detecting that the hand contacts the container, and finding a contact position thereof; a first processing unit calculating a position of the container from a stereo image of the container; a second processing unit calculating a difference between the position of the container calculated by the first processing unit and the contact position found by the contact detection unit as a correction amount; and a third processing unit correcting information on a position in a height direction of the object in the container based on the correction amount.

A robot control device according to another embodiment of this disclosure includes a control unit moving a hand of a robot toward a container housing an object therein, and causing the hand to contact the container at first to sixth different contact positions; a contact detection unit detecting that the hand contacts the container, finding the first to sixth contact positions, and finding a position and orientation of the container from the found first to sixth contact positions; a first processing unit calculating a position and orientation of the container from a stereo image of the container acquired by a camera unit provided in the robot; a second processing unit calculating a homogenous transformation matrix $^F T_C$ expressing a position and orientation of the camera unit viewed from a flange coordinate system fixed on a flange of a wrist of the robot based on the position and orientation of the container calculated by the first processing unit and the position and orientation of the container found by the contact detection unit; and a third processing unit correcting information on a position of the object in the container based on the homogenous transformation matrix $^F T_C$.

A method for controlling a robot according to another embodiment of this disclosure includes the steps of: shooting a container housing an object therein, and acquiring a stereo image of the container; calculating information on a position or orientation of the container as first information based on the stereo image of the container; moving a hand of a robot toward the container; causing the hand to contact the orientation thereby to calculate information on the position or orientation of the container as second information; shooting the object and acquiring a stereo image of the object; calculating information on a position or orientation of the object based on the stereo image of the object; and correcting the information on the position or orientation of the object based on the first and second information.

A method for controlling a robot according to another embodiment of this disclosure includes the steps of: shooting a container housing an object therein, and acquiring a stereo image of the container; calculating a position of the container as a first position based on the stereo image of the container; moving a hand of a robot toward the container; detecting that the hand contacts the container, and finding a contact position thereof as a second position; calculating a difference between the first position of the container and the second position as a correction amount; shooting the object and acquiring a stereo image of the object; calculating a position of the object based on the stereo image of the object; correcting information on a position in a height direction of the object based on the correction amount; and gripping the object by the hand based on the corrected information on the position in the height direction of the object.

A method for controlling a robot according to another embodiment of this disclosure includes the steps of: shooting a container housing an object therein by a camera unit provided in a robot, and acquiring a stereo image of the container; calculating a position and orientation of the container as a first position and orientation based on the stereo image of the container; repeating processing of moving a hand of the robot, toward the container and processing of detecting that the hand contacts the container and finding a contact position thereof, and finding at least six different contact positions; calculating a position and orientation of the container as a second position and orientation from the contact positions; calculating a position and orientation of the camera unit viewed from a flange coordinate system fixed on a flange of a wrist of the robot based on the first position and orientation and the second position and orientation; and gripping the object by the hand of the robot based on the position and orientation of the camera unit viewed from the flange coordinate system.

A robot hand according to another embodiment of this disclosure includes a base part; a pair of grip claws extending from the base part to open and close; and a contact detection member extending from the base part and deforming on contact.

A robot hand according to another embodiment of this disclosure includes a base part; and a pair of grip claws extending from the base part to open and close, wherein one grip claw in the pair of grip claws includes a rigidity change mechanism changing rigidity of the grip claw.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot system comprising:
   a robot including a camera unit shooting an object in a container, a hand gripping the object, and a contact detector detecting that the hand contacts the container; and
   a robot control device controlling the robot,
   wherein the robot control device includes:
   1) a control unit moving the hand toward the container, and causing the hand to contact the container;
   2) a contact detection unit detecting by the contact detector that the hand contacts the container, and finding a contact position thereof;
   3) a first processing unit calculating a position of the container from a stereo image of the container acquired by the camera unit;
   4) a second processing unit calculating a difference between the position of the container calculated by the first processing unit and the contact position found by the contact detection unit as a correction amount; and
   5) a third processing unit correcting information on a position in a height direction of the object in the container based on the correction amount.

2. The robot system according to the claim 1,
   wherein the hand comprises:
   a base part; and
   a contact detection member extending from the base part, and
   deforming when contacting the container, and
   the control unit moves the hand toward the container, and causes the contact detection member to contact the container.

3. The robot system according to claim 2, wherein the contact detection member is configured of an elastic body.

4. The robot system according to claim 1,
   wherein the hand comprises:
   a base part; and
   a pair of grip claws extending from the base part to open and close, and
   one grip claw in the pair of grip claws includes a rigidity change mechanism changing rigidity of the grip claw.

5. The robot system according to claim 4,
wherein the rigidity change mechanism comprises:
a fixing part provided at the base part;
a coil spring fixed at one end on the fixing part;
a grip part fixed at the other end of the coil spring and formed with a hole on a side of the fixing part;
a pin having one end fixed on the fixing part, and a tip facing the hole and being capable of fitting into the hole; and
an advance/retraction mechanism provided on the fixing part and advancing or retracting the pin.

6. A robot system comprising:
a robot including a camera unit shooting an object in a container, a hand gripping the object, and a contact detector detecting that the hand contacts the container; and
a robot control device controlling the robot,
wherein the robot control device includes:
1) a control unit moving the hand toward the container, and causing the hand to contact the container at first to sixth different contact positions;
2) a contact detection unit detecting by the contact detector that the hand contacts the container, finding the first to sixth contact positions, and finding a position and orientation of the container from the found first to sixth contact positions;
3) a first processing unit calculating the position and orientation of the container from a stereo image of the container acquired by the camera unit;
4) a second processing unit calculating a homogenous transformation matrix $^{F}T_{C}$ expressing a position and orientation of the camera unit viewed from a flange coordinate system fixed on a flange of a wrist of the robot based on the position and orientation of the container calculated in the first processing unit and the position and orientation of the container found by the contact detection unit; and
5) a third processing unit correcting information on a position and orientation of the object in the container based on the homogenous transformation matrix $^{F}T_{C}$.

7. The robot system according to claim 6,
wherein the control unit causes the hand to contact the container at a preset site of the hand.

8. A robot system comprising:
a robot including a camera unit shooting an object in a container, and a hand gripping the object; and
a robot control device controlling the robot,
wherein the robot control device comprises:
1) a control unit moving the hand toward the container and causing the hand to contact the container;
2) a contact position output means outputting a contact position when the hand contacts the container;
3) a first processing unit calculating a position of the container from a stereo image of the container acquired by the camera unit;
4) a second processing unit calculating a difference between the position of the container calculated by the first processing unit and the contact position output from the contact position output means as a correction amount; and
5) a third processing unit correcting information on a position of the object in the container based on the correction amount.

\* \* \* \* \*